US011153795B2

(12) United States Patent
Yiu et al.

(10) Patent No.: US 11,153,795 B2
(45) Date of Patent: Oct. 19, 2021

(54) SYSTEMS, METHODS, AND DEVICES FOR REDUCED HANDOVER DATA INTERRUPTION

(71) Applicant: Apple Inc., Cupertino, CA (US)

(72) Inventors: Candy Yiu, Portland, OR (US); Yujian Zhang, Beijing (CN); Youn Hyoung Heo, Seoul (KR); Sudeep Palat, Gloucestershire (GB); Mo-Han Fong, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/077,455

(22) PCT Filed: Sep. 30, 2016

(86) PCT No.: PCT/US2016/055036
§ 371 (c)(1),
(2) Date: Aug. 11, 2018

(87) PCT Pub. No.: WO2017/138988
PCT Pub. Date: Aug. 17, 2017

(65) Prior Publication Data
US 2019/0075498 A1 Mar. 7, 2019

Related U.S. Application Data

(60) Provisional application No. 62/294,858, filed on Feb. 12, 2016.

(51) Int. Cl.
*H04W 36/02* (2009.01)
*H04W 36/18* (2009.01)
*H04W 36/00* (2009.01)

(52) U.S. Cl.
CPC ..... *H04W 36/023* (2013.01); *H04W 36/0022* (2013.01); *H04W 36/18* (2013.01)

(58) Field of Classification Search
CPC ......... H04W 36/0005; H04W 36/0022; H04W 36/0055; H04W 36/0072; H04W 36/0079; H04W 36/023; H04W 36/18; H04W 36/38
See application file for complete search history.

(56) References Cited

U.S. PATENT DOCUMENTS 8,121,094 B2 * 2/2012 Park ................ H04W 36/00835
370/332
8,228,869 B2 * 7/2012 Ahluwalia ............ H04W 36/02
370/331

(Continued)

FOREIGN PATENT DOCUMENTS

WO 2008021217 A1 2/2009
WO 2011040987 A1 4/2011
WO 2012151746 A1 11/2012

OTHER PUBLICATIONS

International Search Report and Written Opinion, dated Feb. 21, 2017, Application No. PCT/US16/55036, Filed Date: Sep. 30, 2016, pp. 3.

*Primary Examiner* — Alpus Hsu
(74) *Attorney, Agent, or Firm* — Eschweiler & Potashnik, LLC

(57) ABSTRACT

User equipment (UE) handover (HO) techniques for reducing or eliminating interruption time during an HO process are described. In one embodiment, for example, an apparatus may include at least one memory and logic for an evolved node B (eNB), at least a portion of the logic comprised in hardware coupled to the at least one memory. The logic may be operative to forward downlink (DL) data received from a serving gateway (SGW) to user equipment (UE), transmit a handover command to the UE to trigger execution of a handover (HO) process to handover the UE to a target eNB, continue forwarding at least a portion of the DL data to the (Continued)

UE following transmission of the handover command, and terminate transmission of the DL data to the UE responsive to detecting a stop DL data event. Other embodiments are described and claimed.

9 Claims, 16 Drawing Sheets

(56) References Cited

U.S. PATENT DOCUMENTS

| | | | | |
|---|---|---|---|---|
| 8,457,640 B2* | 6/2013 | Du | ............... | H04W 36/0055 370/329 |
| 8,570,998 B2* | 10/2013 | Ahluwalia | ............ | H04L 1/1887 370/342 |
| 8,588,181 B2* | 11/2013 | Ahluwalia | ............ | H04L 1/1874 370/331 |
| 8,744,449 B2* | 6/2014 | Song | ............... | H04W 36/0083 455/437 |
| 8,885,600 B2* | 11/2014 | Lee | ............... | H04W 36/02 370/331 |
| 8,886,191 B2* | 11/2014 | Wang | ............... | H04W 36/0072 455/436 |
| 8,891,484 B2* | 11/2014 | Ahluwalia | ............ | H04L 1/1887 370/331 |
| 8,989,741 B2* | 3/2015 | Tamaki | ............ | H04W 36/0011 455/436 |
| 9,072,015 B2* | 6/2015 | Cho | ............... | H04L 1/1874 |
| 9,326,215 B2* | 4/2016 | Cho | ............... | H04W 36/02 |
| 9,445,319 B2* | 9/2016 | Choi | ............... | H04W 36/0061 |
| 9,474,008 B2* | 10/2016 | Byun | ............... | H04W 36/0055 |
| 9,515,689 B2* | 12/2016 | Zhu | ............... | H04B 1/12 |
| 9,538,438 B2* | 1/2017 | Wang | ............... | H04W 16/32 |
| 9,992,815 B2* | 6/2018 | Chen | ............... | H04W 56/002 |
| 10,009,809 B2* | 6/2018 | Hahn | ............... | H04W 36/0094 |
| 10,159,024 B2* | 12/2018 | Hahn | ............... | H04W 36/16 |
| 10,225,779 B2* | 3/2019 | Xu | ............... | H04W 36/08 |
| 2008/0130580 A1 | 6/2008 | Chaponniere et al. | | |
| 2015/0181479 A1 | 6/2015 | Yang et al. | | |
| 2016/0014592 A1* | 1/2016 | Park | ............... | H04W 36/04 370/331 |
| 2016/0037421 A1* | 2/2016 | Jokinen | ............... | H04W 36/12 455/436 |
| 2016/0142973 A1* | 5/2016 | Lee | ............... | H04W 36/165 370/311 |
| 2016/0192261 A1* | 6/2016 | Wang | ............... | H04W 36/0055 370/331 |

* cited by examiner

SYSTEMS, METHODS, AND DEVICES FOR REDUCED HANDOVER DATA INTERRUPTION

CROSS-REFERENCE TO RELATED APPLICATIONS

This application is a national phase application claiming the benefit of and priority to International Patent Application No. PCT/US16/55036, entitled "SYSTEMS, METHODS, AND DEVICES FOR REDUCED HANDOVER DATA INTERRUPTION", filed Sep. 30, 2016, which claims priority to U.S. Provisional Patent Application No. 62/294,858, filed Feb. 12, 2016, both of which are incorporated herein by reference in their entirety.

TECHNICAL FIELD

Embodiments herein generally relate to communications in broadband wireless communications networks.

BACKGROUND

In cellular networks, such as a 3rd Generation Partnership Project (3GPP) Long Term Evolution (LTE) network, when a mobile device (e.g., user equipment or UE) with an active communication connection is moving away from the coverage area of a first cell or base station (for example, a source evolved node B, source eNode B, or source eNB) and entering the coverage area of a second cell or base station (for example, a target eNB), the communication connection may be transferred to the target eNB in order to avoid link termination when the mobile device gets out of coverage of the source eNB. The process for transferring the communication connection of the UE from the source eNB to the target eNB is generally referred to as a handover (HO) process. When the HO process is initiated, the source eNB stops transmitting data to the UE, and the source eNB and target eNB commence a series of communications to manage the HO of the UE. The UE does not receive data from the target eNB until the HO process is complete. Accordingly, data service to the UE is interrupted during the HO process, which degrades UE experience.

DETAILED DESCRIPTION

Figure 1:
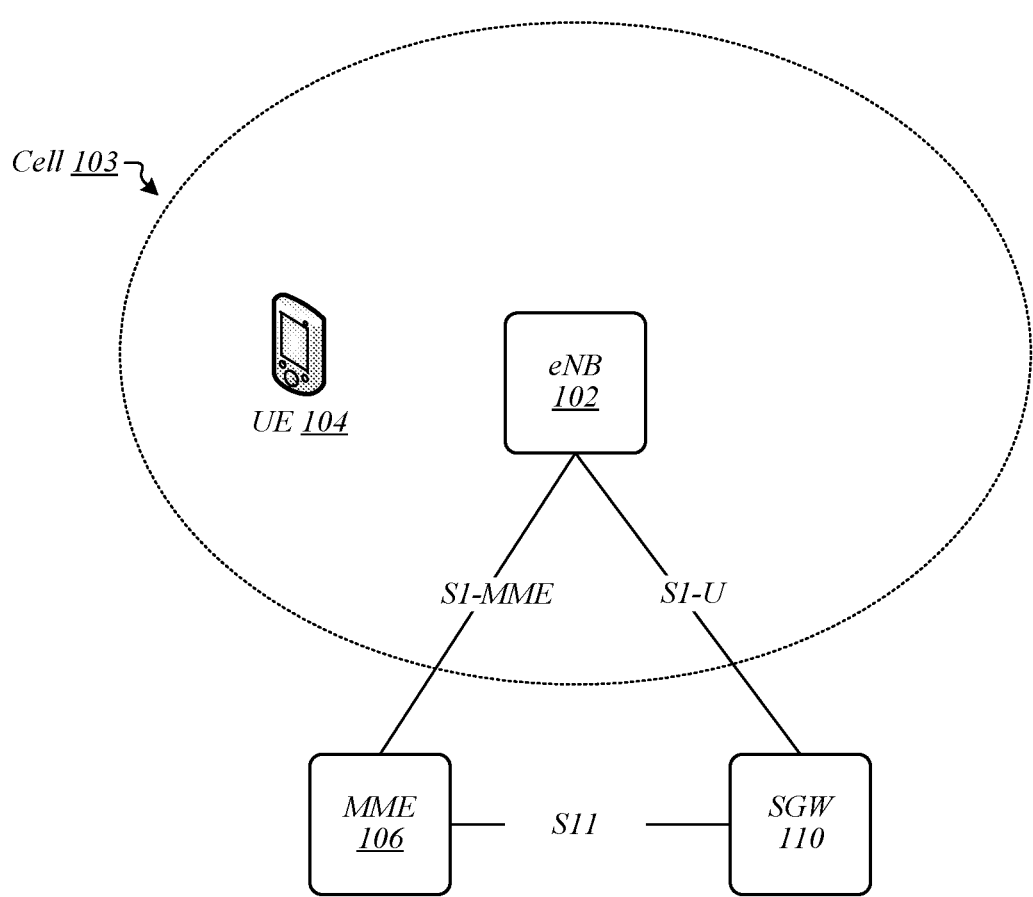
FIG. 1 illustrates an embodiment of a first operating environment.

Various embodiments may be generally directed to handover (HO) techniques for user equipment (UE) in a wireless communication network. In one embodiment, for example, an apparatus may include at least one memory and logic for an evolved node B (eNB), at least a portion of the logic comprised in hardware coupled to the at least one memory. The logic may be operative to forward downlink (DL) data received from a serving gateway (SGW) to user equipment (UE), transmit a handover command to the UE to trigger execution of a handover (HO) process to handover the UE to a target eNB, continue forwarding at least a portion of the DL data to the UE following transmission of the handover command, and terminate transmission of the DL data to the UE responsive to detecting a stop DL data event. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

The techniques disclosed herein may involve transmission of data over one or more wireless connections using one or more wireless mobile broadband technologies. For example, various embodiments may involve transmissions over one or more wireless connections according to one or more 3rd Generation Partnership Project (3GPP), 3GPP Long Term Evolution (LTE), and/or 3GPP LTE-Advanced (LTE-A) technologies and/or standards, including their predecessors, revisions, progeny, and/or variants. Various embodiments may additionally or alternatively involve transmissions according to one or more Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS) technologies and/or standards, including their predecessors, revisions, progeny, and/or variants.

Examples of wireless mobile broadband technologies and/or standards may also include, without limitation, any of the Institute of Electrical and Electronics Engineers (IEEE) 802.16 wireless broadband standards such as IEEE 802.16m and/or 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth), High Performance Radio Metropolitan Area Network (HIP- ERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their predecessors, revisions, progeny, and/or variants.

Some embodiments may additionally or alternatively involve wireless communications according to other wireless communications technologies and/or standards. Examples of other wireless communications technologies and/or standards that may be used in various embodiments may include, without limitation, other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, and/or IEEE 802.11ah standards, High-Efficiency Wi-Fi standards developed by the IEEE 802.11 High Efficiency WLAN (HEW) Study Group, Wi-Fi Alliance (WFA) wireless communication standards such as Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, 3GPP TS 23.682, and/or 3GPP TS 30.300, and/or near-field communication (NFC) standards such as standards developed by the NFC Forum, including any predecessors, revisions, progeny, and/or variants of any of the above. The embodiments are not limited to these examples.

In addition to transmission over one or more wireless connections, the techniques disclosed herein may involve transmission of content over one or more wired connections through one or more wired communications media. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

FIG. 1 illustrates an example of an operating environment 100 that may be representative of various embodiments. The operating environment 100 depicted in FIG. 1 may include a wireless communication network, including, without limitation, an evolved universal terrestrial radio access network (EUTRAN) 3GPP LTE radio access network (RAN) based on the 3GPP LTE specification, for instance, 3GPP Releases 8, 9, 10, 11, 12, and/or 13.

In operating environment 100, an evolved node B (eNB) 102 may serve a geographic area, such as cell 103. User equipment (UE) 104 located within cell 103 may be provided with wireless connectivity and communication services by eNB 102. For example, downlink (DL) data transmission may include communications and/or packet data transmissions from eNB 102 to UE 104 and uplink (UL) data transmission may include communications and/or packet data transmissions from UE 104 to eNB 102. A mobility management entity (MME) 106 may be a main control node for a wireless communication network that includes cell 103 served by eNB 102. MME 106 may be capable of exchanging communications with eNBs, such as eNB 102, over respective S1-MME interface connections with each eNB. MME 106 may communicate with eNB 102 to track and send messages to UE 104. MME 106 may communicate with other UEs besides UE 104 through eNB 102 and/or one or more other eNBs other than eNB 102. A serving gateway (SGW) 110 may support various data services, such as packet data, video data, messaging, and/or the like. The MME 106 and SGW 110 may be capable of exchanging communications over an S11 interface. The MME 106 and/or SGW 110 may be in communication with a core and/or data network (not shown), such as an evolved packet core (EPC) and/or the Internet. For example, SGW 110 may route packets between a core network and a RAN of the eNB 102. An S1-U interface may be used for exchanging communications between SGW 110 and eNB 102.

Figure 2:
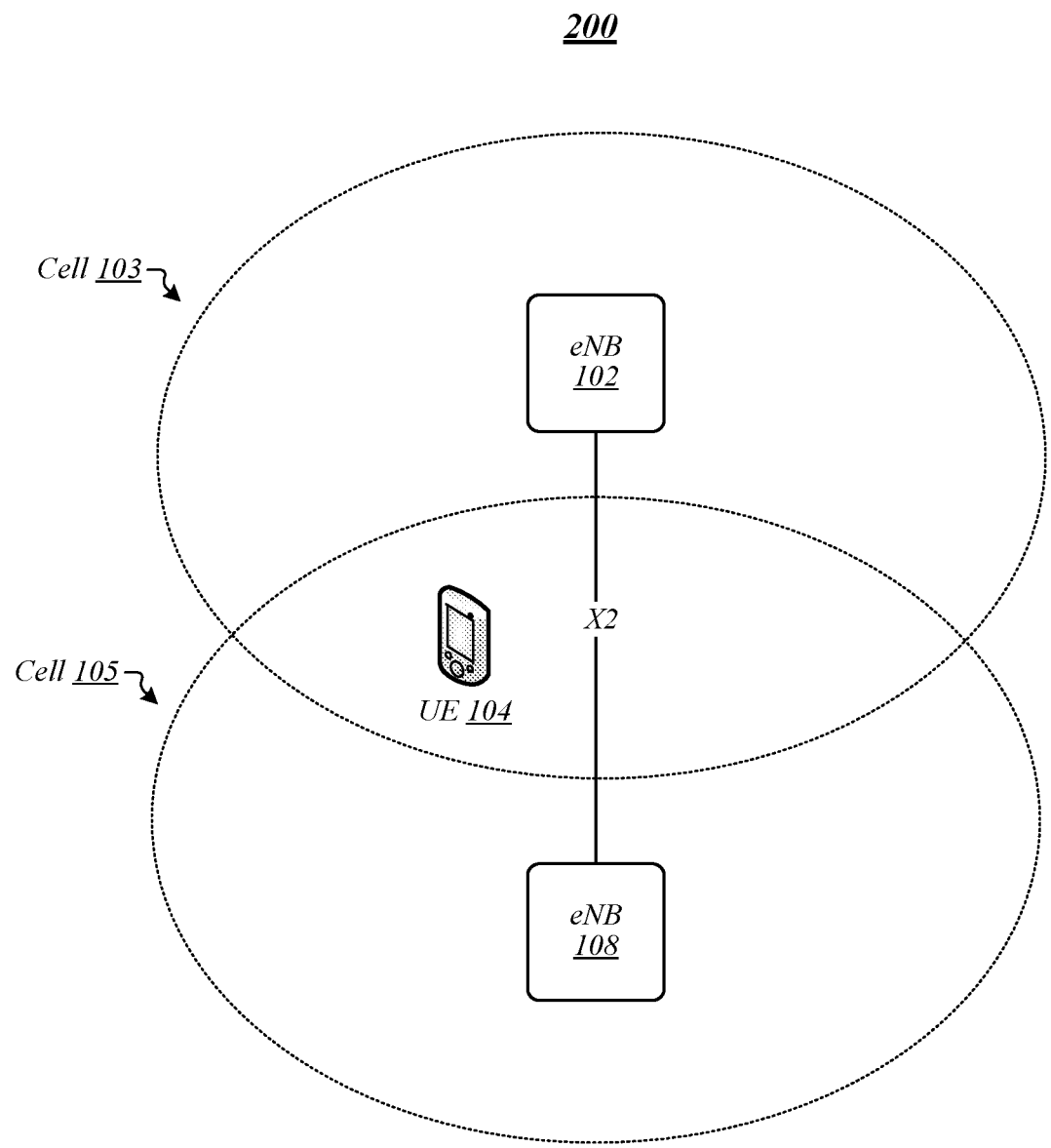
FIG. 2 illustrates an embodiment of a second operating environment.

FIG. 2 illustrates an example of an operating environment 200 that may be representative of various embodiments. As illustrated in FIG. 2, eNB 102 may provide wireless communication services to communication devices, such as UE 104, within cell 103, and eNB 108 may provide wireless communication services to communication devices within cell 105. In various embodiments, eNBs 102 and 108 may be capable of exchanging communications with each other over an X2 interface connection. In various embodiments, operating environment 200 may support handover (HO) processes. For example, UE 104 may initially communicate with eNB 102 for data exchanges with MME 106 and/or serving gateway 110. UE 104 may be mobile and may move from cell 103, which is served by eNB 102, to cell 105, which is served by eNB 108. An HO process may be initiated when UE 104 enters a coverage area of cell 105 when certain handover criterion are met. In various embodiments, an HO process may be initiated responsive to other events, such as load balancing. A non-limiting example of an HO process may include the process described in 3GPP TS 36.300, for instance, at Section 10.1.2.1.1. The embodiments are not limited in this context.

The HO process may operate to hand over communications of UE 104 from eNB 102 to eNB 108. During the HO process, eNB 102 may be referred to as a "source eNB" and eNB 108 may be referred to as a "target eNB." In general, a source eNB is the eNB in active communication with the UE when the HO process is initiated, and a target eNB is the eNB that the UE is transferred to as a result of the HO process. After the HO process is complete, UE 104 may communicate with eNB 108 for data exchanges with MME 106 and/or serving gateway 110.

Figure 3:
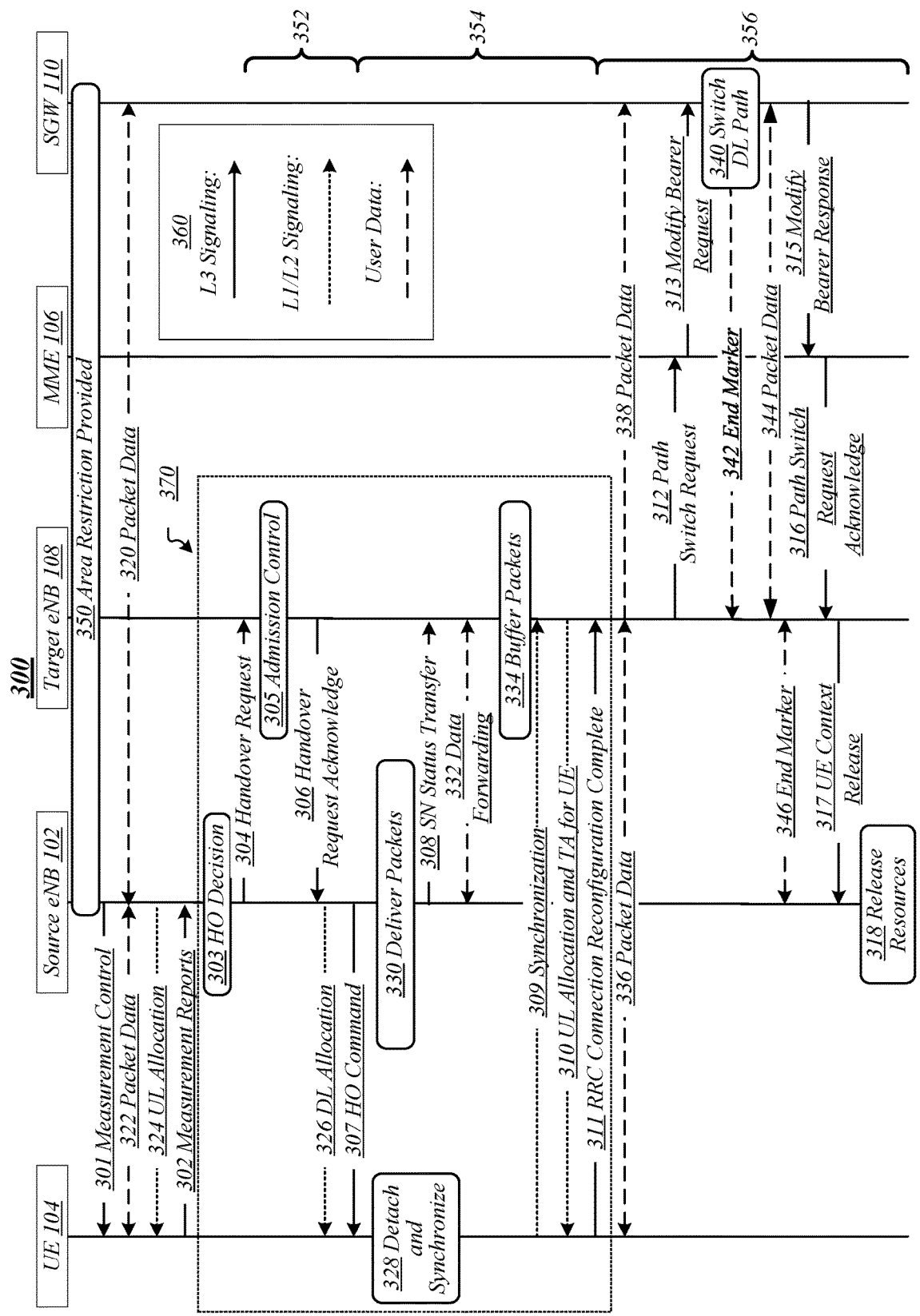
FIG. 3 illustrates an embodiment of a first communications flow.
Figure 4:
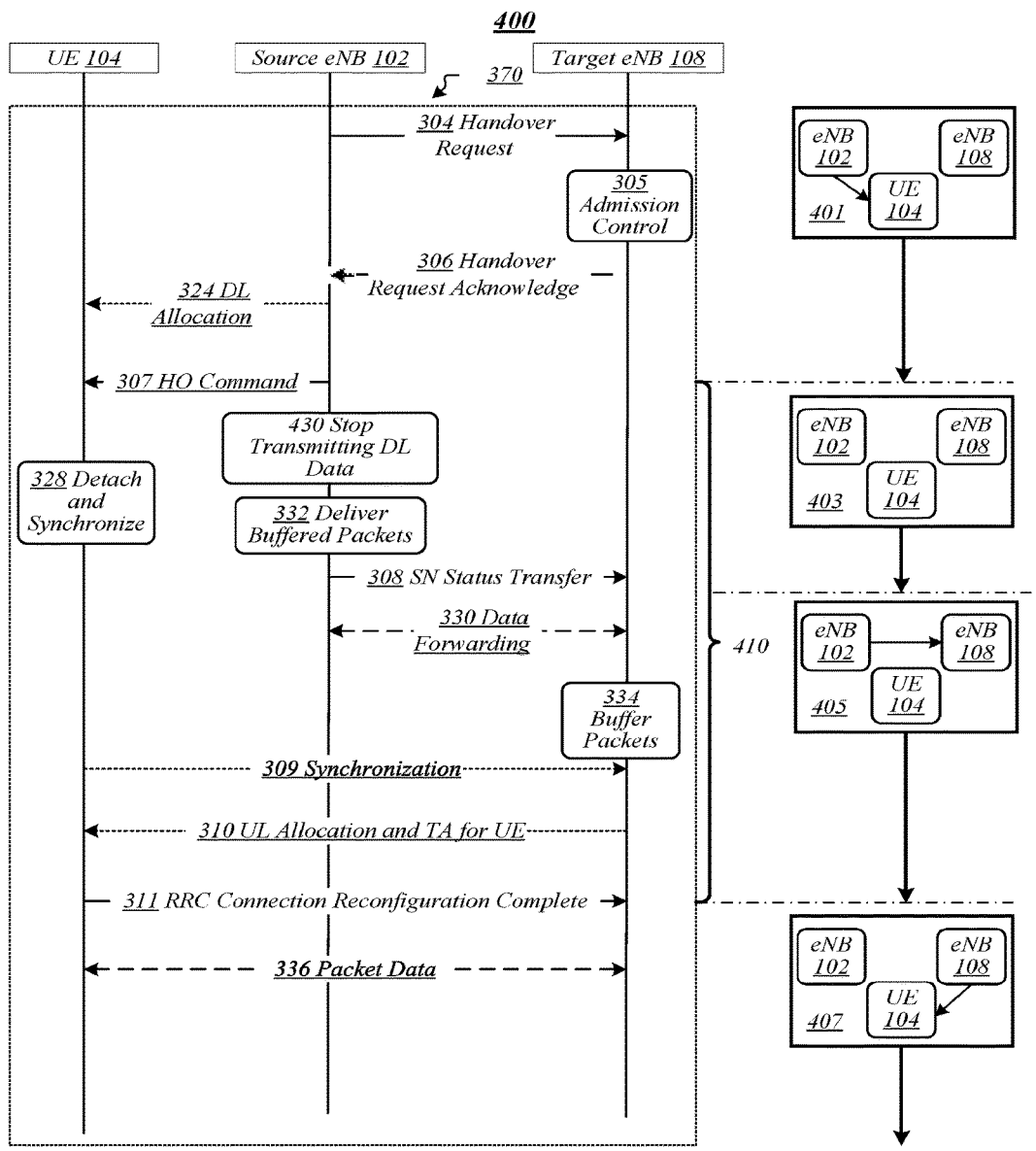
FIG. 4 illustrates an embodiment of a second communications.

In a conventional HO process, transmission of DL packet data (or DL data) to UE 104 via eNB 102 is terminated responsive to initiation of the HO process (see, for example, FIGS. 3 and 4). In addition, UE 104 does not receive DL data from target eNB 108 during the HO process until handover is complete and UE 104 has established communication with target eNB 108. Therefore, UE 104 does not have data reception during a execution of conventional HO process, generating an interruption time at UE 104. The interruption time degrades user experience with and leads to packet loss at UE 104 on the network. Accordingly, in various embodiments, source eNB 102, UE 104, and/or target eNB 108 may be configured to facilitate, among other things, the transmission of DL data from source eNB 102 to UE 104 during execution of the HO process to reduce or completely eliminate the interruption time compared with a conventional HO process.

FIG. 3 illustrates an example of a communications flow 300 that may be representative of a series of communications that may be exchanged among source eNB 102, UE 104, MME 106, target eNB 108, and/or SGW 110 of FIG. 1 and FIG. 2 in various embodiments during an HO process. More particularly, communications flow 300 may be representative of an inter-eNB HO process performed between source eNB 102 and target eNB 108, for example, in accordance with one or more of the 3GPP LTE Specifications (for example, 3GPP TS 36.300). The embodiments are not limited to this example scenario. Legend 360 depicts different data flow types shown in FIGS. 3-7. Detail area 370 includes a portion of communication flow elements depicted in detail in FIG. 4.

As shown in FIG. 3, a UE context 350 may be established for UE 104 within the network. In various embodiments, the UE context 350 may include information regarding roaming and access restrictions provided, for example, when UE 104 established a connection with source eNB 102 and/or a timing advance (TA) update. Communications flow 300 may begin at 301, where source eNB 102 may transmit a measurement control message to UE 104. In various embodiments, the measurement control message may operate to configure the measurement procedures for UE 104, for example, specifying reported metrics, quality or signal thresholds, and/or the timing of measurement reports. Packet data 320 may be transmitted to/from SGW 110 from/to source eNB 102. For example, network DL data may be transmitted as packet data 320 from SGW 110 to source eNB 102, and user UL data may be transmitted as packet data 320 from source eNB 102 to SGW 110. Packet data 322 to/from source eNB 102 may be transmitted from/to UE 104. Accordingly, prior to execution of the HO process, DL data destined for UE 104 may be transmitted as packet data 320 from SGW 110 to source eNB 102, and as packet data 322 from source eNB 102 to UE 104. In addition, prior to execution of the HO process, UL data from UE 104 may be transmitted as packet data 322 from UE 104 to source eNB 102, and as packet data 320 from source eNB 102 to SGW 110. Source eNB 102 may allocate UL transmission for UE 104 at 324.

In various embodiments, UE 104 may transmit a measurement report to source eNB 102 at 302. The measurement report may be configured according to the measurement control message sent from source eNB 102 to UE 104 at 301. In various embodiments, the measurement report may include information relating to network components, such as cells, eNBs, and/or the like. In various embodiments, the measurement report may include metrics relating to signal strength, resources, and/or the like of the network components. For example, the measurement report may include information indicating the signal strength of the current cell of UE 104 (for example, cell 103) and neighboring cells (for example, cell 105).

Source eNB 102 may generate an HO decision at 303 based on the measurement report and other information, such as radio resource management (RRM) information. For example, if the signal strength of a neighboring cell is greater than the signal strength of the current cell serving UE 104 by a threshold amount, an event may be triggered to cause UE 104 to send the measurement report to the source eNB 102. Source eNB 102 may use the measurement report to decide to handover UE 104 to the eNB of the neighboring cell. If source eNB 102 decides to handover UE 104 to target eNB 108, source eNB 102 may transmit a handover request message to target eNB 108 at 304. The handover request message may include information necessary for target eNB 108 to prepare for the HO process. For example, the information in the handover request message may include, without limitation, reason(s) for handover, UE signaling context references, radio resource control (RRC) context, Radio Access Bearer (RAB) context, target cell identifiers, and/or the like. Communications flow 300 may enter a handover preparation phase 352 following receipt of the handover request message by target eNB 108 at 304.

Target eNB 108 may perform admission control at 305 to determine whether target eNB 108 has sufficient resources to serve UE 104. If admission control of target eNB 108 accepts the handover request, target eNB 102 may transmit a handover requests acknowledgment message to source eNB 102 at 306. The handover request acknowledgment message may include an RRC RRCConnectionReconfiguration message for source eNB 102 to forward to UE 104. In various embodiments, the RRCConnectionReconfiguration message may include parameters necessary for UE 104 to attach to target eNB 108. Source eNB 102 may allocate DL transmission for UE 104 at 326.

Source eNB 102 may transmit a HO command to UE 104 at 307. In some embodiments, the HO command may include a message configured to trigger UE 104 to initiate an HO process. In some embodiments, the HO command may be an RRCConnectionReconfiguration (including mobilityControlInformation) message. In various embodiments, the RRCConnectionReconfiguration (including mobilityControlInformation) message may include, without limitation, information such as a random access channel (RACH) preamble assignment, target cell radio network temporary identifier (C-RNTI), target data radio bearer (DRB) identifiers (UL/DL), and/or target eNB security information. Communications flow 300 may enter a handover execution phase 354 following the transmission of the HO command by source eNB 102 at 307.

In a conventional HO process, source eNB 102 stops transmitting DL data to UE 104 after transmitting the HO command message. In addition, at 328, UE 104 detaches from source eNB 102 and begins synchronizing with target eNB 108 after receiving the HO command at 307. Source eNB 102 may buffer for future delivery and/or forward packet data 320 destined for UE 104 to target eNB 108 following termination of transmission of DL data to UE 104 by source eNB 102.

At 308, source eNB 102 may transmit a sequence number (SN) status transfer message to target eNB 108. In general, the information included in the SN status transfer message may allow target eNB 108 to forward DL data, including buffered DL data received from source eNB 102, to UE 104 after the HO process is complete. The SN status transfer message may provide target eNB 108 with the UL packet data convergence protocol (PDCP) SN receiver status and the DL PDCP SN transmitter status of E-UTRAN radio access bearers (E-RABs) for which PDCP status preservation applies. For UL data, the SN status transfer message may include a sequence number of a first missing data unit. For DL data, the SN status transfer message may include a next sequence number to be allocated for UE 104 DL data. Source eNB 102 may forward DL packet data received from SGW 110 destined for UE 104 to target eNB 108 at 332. Target eNB 108 may buffer the DL packet data at 334 for transmission to UE 104 when UE 104 has established a connection with target eNB 108.

After receiving the HO command at 307, UE 104 may perform synchronization to target eNB at 309. During synchronization at 309, UE 104 may access target eNB 108 via a random access channel (RACH) procedure. The RACH procedure may follow a contention-free procedure if a dedicated RACH preamble was indicated in the HO command (for instance, in the mobilityControlInformation), or follow a contention-based procedure if no dedicated preamble was indicated in the HO command In addition, during synchronization, UE 104 may derive one or more security keys specific for target eNB 108 and may configure security algorithms to be used with target eNB 108 and/or in the cell served by target eNB 108. In response to synchronization at 309, target eNB 108 may respond by performing UL allocation and TA with UE 104 at 310. In various embodiments, target eNB 108 may send a Random Access Response (RAR) message to UE 104 at 310 that includes information such as TA, target C-RNTI, and UL grant information. Responsive to UE 104 successfully accessing target eNB 108, UE 104 may transmit an RRCConnectionReconfigurationComplete message to target eNB 108 at 311 to confirm the handover of UE 104 to target eNB 108. The RRCConnectionReconfigurationComplete message may include a C-RNTI that may be verified by target eNB 108.

Following processing and verification of the handover request message by target eNB 108, target eNB 108 may initiate transmission of DL data to UE 104 at 336. Communications flow 300 may enter a handover completion phase 356 following receipt and processing of the RRCConnectionReconfigurationComplete message by target eNB 108 at 311.

At 312, target eNB 108 may transmit a path switch request message to MME 106 to inform MME 106 that UE 104 has been handed over to target eNB 108 (for instance, that UE has switched from cell 103 to cell 105). The path switch request message may operate to notify MME 106 about the updated location of UE 104 and to request a switch of the user plane path from source eNB 102 to target eNB 108. In response to the path switch request message, MME 106 may transmit a modify bearer request message to SGW 110 at 313. Responsive to receiving the modify bearer request message, SGW 110 may switch a DL path from source eNB 102 to target eNB 108 at 340. Packet data 344 may be transmitted between target eNB 108 and SGW 110 after the DL path has been switched by the SGW. After switching the DL path, SGW 110 may transmit an end marker message to source eNB 108 at 342, and SGW 110 may release various resources relating to source eNB 102. Source eNB 102 may transmit the end marker message to target eNB 108 to indicate to target eNB 108 that source eNB 102 will cease forwarding data to target eNB 108.

At 315, SGW 110 may transmit a modify bearer response message to MME 106, for example, to signify a successful path switch between SGW 110 and target eNB 108. The path switch request message may be confirmed by MME 106 via a path switch request acknowledge message at 316. A UE context release message may be transmitted by target eNB 108 to source eNB 102 at 317. The UE context release message may operate to inform source eNB 102 that the HO process has completed successfully, for example, after target eNB 108 has received the path switch request acknowledge message from MME 106. In response to receipt of the UE context release message, source eNB 102 may release resources related to UE 104 at 318, including radio and control plane resources.

FIG. 4 illustrates an example of DL transmission during a communications flow 400 that may be representative of the implementation of one or more HO processes according to some embodiments. More particularly, communications flow 400 depicts detail area 370 of FIG. 3 with DL transmission phases between source eNB 102, target eNB 108, and/or UE 104. DL transmission phases 401-407 graphically depict the transmission (or lack of transmission) of DL data between source eNB 102 and UE 104 and/or target eNB 108 and UE 104 during a portion of the HO process.

As shown in DL transmission phase 401 of FIG. 4, DL data is being transmitted from source eNB 102 to UE 104 during the HO preparation phase (for instance, from 304 to 307). DL transmission phase 403 depicts that source eNB 102 has stopped transmitting DL data to UE 104 at 430 after source eNB 102 transmits the HO command to UE 104 at 307. At DL transmission phase 403, target eNB 108 has not started transmitting DL data to UE 104. Accordingly, no DL data is being transmitted to UE 104, initiating an interruption time 410. The conventional HO process according to 3GPP LTE is a "hard" handover during which the interface between UE 104 and source eNB 102 is terminated before a new connection is made between UE 104 and source eNB 108. In an attempt to prevent packet loss, source eNB 102 forwards DL data to target eNB 108, as indicated in DL transmission phase 405. However, DL data is still not being transmitted to UE 104 during DL transmission phase 405, extending interruption time 410. As shown in DL transmission phase 407, target eNB 108 may initiate transmission of DL data to UE 104 following transmission of the RRCConnectionReconfigurationComplete message by UE 104 to target eNB 108 at 311.

As depicted in FIG. 4, UE 104 does not have any data reception after source eNB 102 transmits the HO command at 307 until after the HO process is complete and target eNB 108 receives the RRCConnectionReconfigurationComplete message at 311. This interruption time 410 during the HO process degrades user experience and may lead to packet loss. Accordingly, various embodiments provide for methods, apparatus, and computer-readable media for, among other things, transmitting DL data from source eNB 102 to UE 104 during the HO process, forwarding DL data from source eNB 102 to target eNB 108, and sending the SN Status Transfer message in order to reduce or eliminate interruption time 410 and/or packet loss to improve user experience during the HO process.

Figure 5:
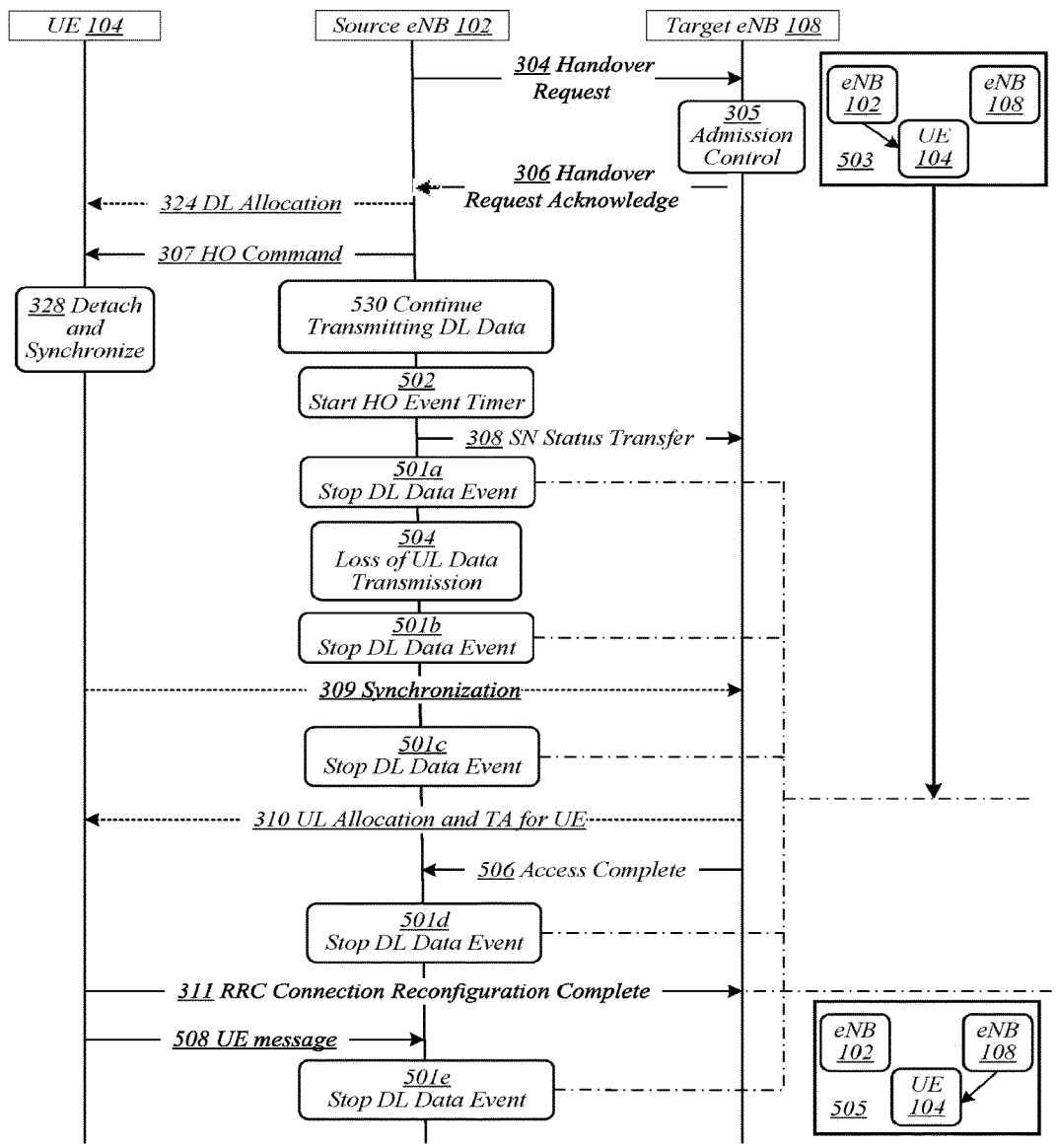
FIG. 5 illustrates an embodiment of a third communications flow.

FIG. 5 illustrates an example of a communications flow 500 that may be representative of a series of events that may initiated and communications that may be exchanged among source eNB 102, UE 104, and target eNB 108 during an HO process according to some embodiments. More particularly, communications flow 500 may be representative of modifications to a portion of communications flow 300 to implement termination of DL data transmission from source eNB 102 to UE 104 during an HO process according to various embodiments. Communication flow 500 depicts a portion of the elements of communications flow 300 of FIG. 3 to simplify the figure. Accordingly, an HO process configured according to various embodiments depicted in communications flow 500 may include additional HO process events depicted in communications flow 300 of FIG. 3.

As shown in FIG. 5, communications flow 500 reflects various embodiments in which source eNB 102 continues to transmit DL data to UE 104 at 530 after transmitting the HO command message to UE 104 at 307. DL transmission phases 503 and 505 graphically depict the status of the transmission of DL data to UE 104 by source eNB 102 or target eNB 108 during the illustrated portion of the HO process. For example, DL transmission phase 503 shows that source eNB 102 transmits DL data to UE 104 during the HO process until at least one of stop DL data events 501a-e occurs. DL transmission phase 505 shows that target eNB 108 may transmit DL data to UE following 311. In contrast, during a conventional HO process, source eNB 102 stops transmitting DL data to UE 104 after transmitting the HO command to UE 104 at 307 (see, for example, DL transmission phase 403 of FIG. 4). Accordingly, HO processes according to various embodiments operate to reduce or completely eliminate interruption time (e.g., interruption time 410 of FIG. 4) experienced by UE 104 during an HO process compared with an interruption time experienced by UE 104 during conventional HO processes.

In various embodiments, source eNB 102 may be configured with the capability to detect an occurrence of a stop DL data event 501 a-e by monitoring network communications, messages, components, events, and/or the like. In various embodiments, a stop DL data event 501 a-e may include an HO process event. In general, an HO process event may include any event that may occur during an HO process. An HO process event may be carried out by various network components, including, without limitation, source eNB 102, UE 104, MME 106, target eNB 108, SGW 110, and/or the like. Illustrative and non-restrictive examples of HO process events may include transmission of a message, receipt of a message, a component establishing communication with another component, a component detaching from or otherwise terminating communication with another component, initiation of a process, step, method, and/or the like, completion of a process, step, method, and/or the like, combinations thereof, and/or the like. Accordingly, source eNB 102 may have a plurality of options of stop DL data events 501 a-e for terminating the transmission of DL data to UE 104 during an HO process according to various embodiments.

In some embodiments, source eNB 102 may detect an HO process event directly. For example, source eNB 102 may directly detect that source eNB 102 has transmitted the HO command to UE 104 at 307. In some embodiments, source eNB 102 may detect an HO process event indirectly based on detection of a different, related event. For example, source eNB 102 may not directly determine whether UE 104 has established a connection with target eNB 104. However, source eNB 102 may indirectly determine that UE 104 has established a connection with target eNB 104 as a result of receiving the UE context release message transmitted by target eNB 108. In some embodiments, source eNB 102 may detect an HO process event by estimating when the HO process event may occur. Embodiments are not limited in this context.

In various embodiments, source eNB 102 may include, determine, or otherwise access event estimate information that may include information for estimating an occurrences of various HO process events. In some embodiments, event estimate information may include an expected time duration from a first event (e.g., 307) to a second event (e.g., 311). For example, the event estimate information may indicate that a second event is estimated to occur about 50 milliseconds after the occurrence of a first event. In various embodiments, event estimate information may include a time-of-day value (e.g., hours:minutes:seconds:milliseconds or the like) for an occurrence of an HO event (e.g., HO event 311 is expected to occur at 12:00:00:50 pm). In various embodiments, the event estimate information may be based on historical performance information, third-party estimate information, network component characteristics (e.g., UE characteristics, eNB characteristics, and/or the like), network characteristics, combinations thereof, and/or the like.

In various embodiments, source eNB 102 may be configured with the capability to start one or more HO event timers at 502. In various embodiments, an HO event timer may be used by source eNB 102 to estimate an occurrence of an HO process event. Although FIG. 5 depicts an HO event timer being started at 502 after 307, embodiments are not so limited, as the position of the start 502 of the HO event timer is provided for illustrative purposes. In various embodiments, an HO event timer may be started at various other times during the HO process. For example, referring to FIG. 3, an HO event timer may be started after 304, after 306, after 308, after 309, after 310, after 311, after 312, after 313, after 314, after 315, after 316, and/or after 317. In various embodiments, source eNB 102 may start a plurality of HO event timers. In various embodiments that include a plurality of HO event timers, one or more of the plurality of HO event timers may be started at a same time. In various embodiments that include a plurality of HO event timers, one or more of the plurality of HO event timers may be started at one or more different times. In various embodiments, an HO event timer may be associated with a plurality of HO process events. Embodiments are not limited in this context.

In some embodiments, source eNB 102 may use an HO event timer and the event estimate information to estimate an occurrence of one or more HO process events. For example, source eNB 102 may start an HO event timer following a first HO process event. Source eNB 102 may determine an estimated time for a second HO process event to occur based on the event estimate information. For example, the event estimate information may indicate that 309 occurs 50 milliseconds following 307. Source eNB 102 may start an HO event timer. When the HO event timer equals the estimated time, source eNB 102 may determine that the second HO process event has occurred for estimation purposes. Alternatively, source eNB 102 may start a countdown HO event timer having a duration equal to the estimated time. When the countdown HO event timer expires, source eNB 102 may determine that the second HO process event has occurred for estimation purposes.

Figure 7:
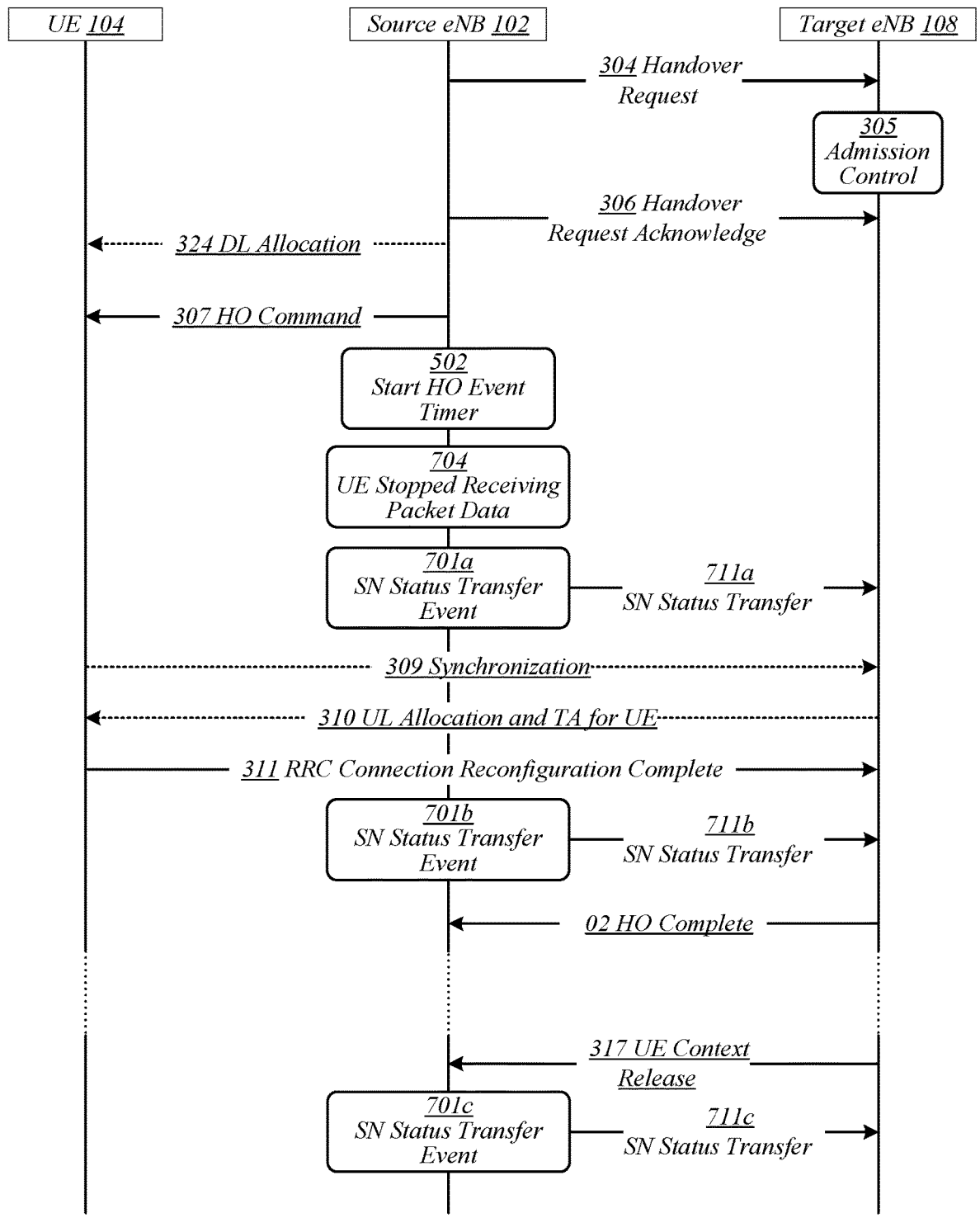
FIG. 7 illustrates an embodiment of a fifth communications flow.

In various embodiments, stop DL data event 501a may include transmission of the SN status transfer message at 308. For example, source eNB 102 may detect the transmission of the SN status transfer message at 308 and, in response, source eNB 102 may stop transmitting DL data to UE 104. Although FIGS. 3-5 depict the transmission of the SN status transfer message at 308 occurring between 307 and 309, embodiments are not so limited. For example, FIG. 7 depicts various embodiments in which the transmission of the SN status transfer message may occur at different positions in the HO process. For example, the transmission of the SN status transfer message at 308 may occur after 309, after 310, after 311, after 312, after 313, after 314, after 315, after 316, or after 317. Embodiments are not limited in this context.

In various embodiments, stop DL data event 501b may include detection and/or estimation of acknowledgement for UL or DL data transmission. For example, UE 104 may send acknowledgment messages, bits, information, frames, and/or the like to source eNB 102 for DL data. In another example, UE 104 may transmit acknowledgment messages, bits, information, frames, and/or the like in a UL transmission (for instance, to confirm error checking or the like). In some embodiments, stop DL data event 501b may include detection and/or estimation of a loss of an acknowledgment from UE 104, for example, for DL data.

In various embodiments, stop DL data event 501b may include detection and/or estimation of a loss or stoppage of UL or DL data transmission from/to UE 104. In some embodiments, stop DL data event 501b may include detection of a loss of UL data transmission from UE 104. For example, source eNB 102 may be configured with the capability of detecting when UE 104 stops transmitting UL data to source eNB 102. In some embodiments, source eNB 102 may detect and/or estimate when UE 104 stops transmitting UL data based on lack of a status report (for example, a buffer status report (BSR)) relating to transmission of UL by UE 104. During the HO process according to various embodiments, UE 104 may initiate detachment or partial detachment from source eNB 102 and may initiate synchronization (e.g., synchronization at 309) with target eNB 104. When UE 104 detaches or partially detaches from source eNB 102, UE 104 may stop transmitting UL data and/or acknowledgment messages for DL data to source eNB 102.

In some embodiments, stop DL data event 501b may be triggered when source eNB 102 detects that UE 104 has stopped transmitting acknowledgment messages, bits, information, and/or the like for DL data. In some embodiments, stop DL data event 501b may be triggered when source eNB 102 detects that UE 104 has stopped transmitting UL data. In response to stop DL data event 501b, source eNB 102 may stop transmitting DL data to UE 104. Although FIG. 5 depicts stop data event 501b occurring after 308 and before 309, embodiments are not so limited. For example, stop DL data event 501b may occur after 307, after 309, after 310, after 311, after 312, after 313, after 314, after 315, after 316, or after 317. Embodiments are not limited in this context.

In various embodiments, stop DL data event 501c may include performance of at least a portion of the RACH procedure by UE 104. For example, the portion of the RACH procedure may include initiation of the RACH procedure, completion of the RACH procedure, and/or transmission of a RACH message by UE 104 to target eNB 108 during the RACH procedure. In various embodiments, the RACH procedure may be performed by UE 104 during synchronization at 309 to allow UE 104 to access target eNB 108. In some embodiments, in response to source eNB 102 detecting stop DL data event 501c, source eNB 102 may stop transmitting DL data to UE 104.

In various embodiments, source eNB 102 may detect stop DL data event 501c by estimating when UE 104 may be operative in a portion of the RACH procedure during the HO process. For example, source eNB 102 may start an HO event timer during the HO process. In some embodiments, source eNB 102 may start the HO event timer following 307 or 308. Source eNB 102 may access event estimate information to determine an estimate of when UE 104 may perform the portion of the RACH procedure, for example, at 309. Accordingly, source eNB 102 may detect that stop DL data event 501c has occurred when the estimated time for UE 104 to perform the portion of the RACH procedure has transpired (e.g., when the corresponding HO timer has expired).

In various embodiments, target eNB 108 may transmit a message to source eNB 102 indicating that UE 104 has successfully initiated a connection process, established a connection, or otherwise accessed target eNB 108. In some embodiments, the UE context release message (for instance, transmitted at 317 in FIG. 3) transmitted from target eNB 108 to source eNB 102 may indicate that UE 104 has successfully accessed target eNB 108. In some embodiments, target eNB 108 may be configured to transmit an access complete message to source eNB 102 at 506 to indicate that UE 104 has successfully accessed target eNB 108. Although FIG. 5 depicts the access complete message being sent at 506 after 310 and before 311, embodiments are not so limited. For example, the access complete message being sent at 506 may occur after 309, after 311, after 312, after 313, after 314, after 315, after 316, or after 317. Embodiments are not limited in this context.

In various embodiments, stop DL data event 501d may include source eNB 102 detecting that UE 104 has successfully accessed target eNB 102. In some embodiments, source eNB 102 may detect stop DL data event 501d via receipt of a message from target eNB 108, such as the UE context release message and/or the access complete message at 506. In some embodiments, following source eNB 102 detecting stop DL data event 501d, source eNB 102 may stop transmitting DL data to UE 104.

In various embodiments, UE 104 may be configured to communicate with source eNB 102 during the HO process following receipt of the HO command by UE 104 at 307 and initiation of detachment from source eNB 102 and synchronization with target eNB 108 at 328. For example, UE 104 may maintain messaging communication with source eNB 102 during the HO process or a portion of the HO process. In some embodiments, UE 104 may transmit a UE message at 508 with information for source eNB 102 from UE 104. Non-limiting examples of information in the UE message may include instructions for source eNB 102 to stop transmitting DL data, UE 104 status information (for example, information indicating that UE 104 has successfully accessed target eNB 108, and/or the like), and/or the like. In some embodiments, UE 104 may transmit a plurality of UE messages. Although FIG. 5 depicts the UE message being sent at 508 after 311, embodiments are not so limited. For example, the UE message being sent at 508 may occur after 307, after 308, after 309, after 311, after 312, after 313, after 314, after 315, after 316, or after 317. Embodiments are not limited in this context In various embodiments, stop DL data event 501e may include receipt of the UE message at 508 by source eNB 102. In some embodiments, in response to source eNB 102 detecting stop DL data event 501e, source eNB 102 may stop transmitting DL data to UE 104.

In some embodiments, source eNB 102 may be capable of detecting one or more of stop DL data events 501a-e. In some embodiments, one or more of stop DL data events 501a-e may be active and the remaining, if any, stop DL data events 501a-e may be inactive. In some embodiments, source eNB 102 may monitor for active stop DL data events 501a-e and may not monitor for inactive stop DL data events 501a-e. For example, source eNB 102 may be monitoring for stop DL data event 501a, but not stop DL data events 501b-e. In some embodiments, source eNB 102 may activate an HO event timer for active stop DL data events 501a-e and may not activate an HO event timer for inactive stop DL data events 501a-e. In some embodiments, active stop DL data events 501a-e may trigger source eNB 102 to stop forwarding DL data to UE 104, and inactive stop DL data events 501a-e, even if detected by source eNB 102, may not trigger source eNB 102 to stop forwarding DL data to UE 104.

In various embodiments, selection of active and/or inactive stop DL data events 501a-e may be determined by various network components, including, without limitation, source eNB 102, UE 104, MME 106, target eNB 108, SGW 110, and/or EPC components. In various embodiments, selection of active and/or inactive stop DL data events 501a-e may be selected based on one or more selection factors, including, without limitation, UE characteristics, eNB characteristics, network characteristics, UE performance, eNB performance, network performance, historical information, estimation success rate and/or probability, and/or the like.

Although FIG. 5 depicts stop DL data event 501a-e associated with certain HO process events, embodiments are not so limited. For example, other stop DL data events associated with other HO process events may be implemented according to various embodiments. In another example, a stop DL data event may be associated with a plurality of HO process events required to transpire before triggering the stop DL data event. The embodiments are not limited in this context.

Figure 6:
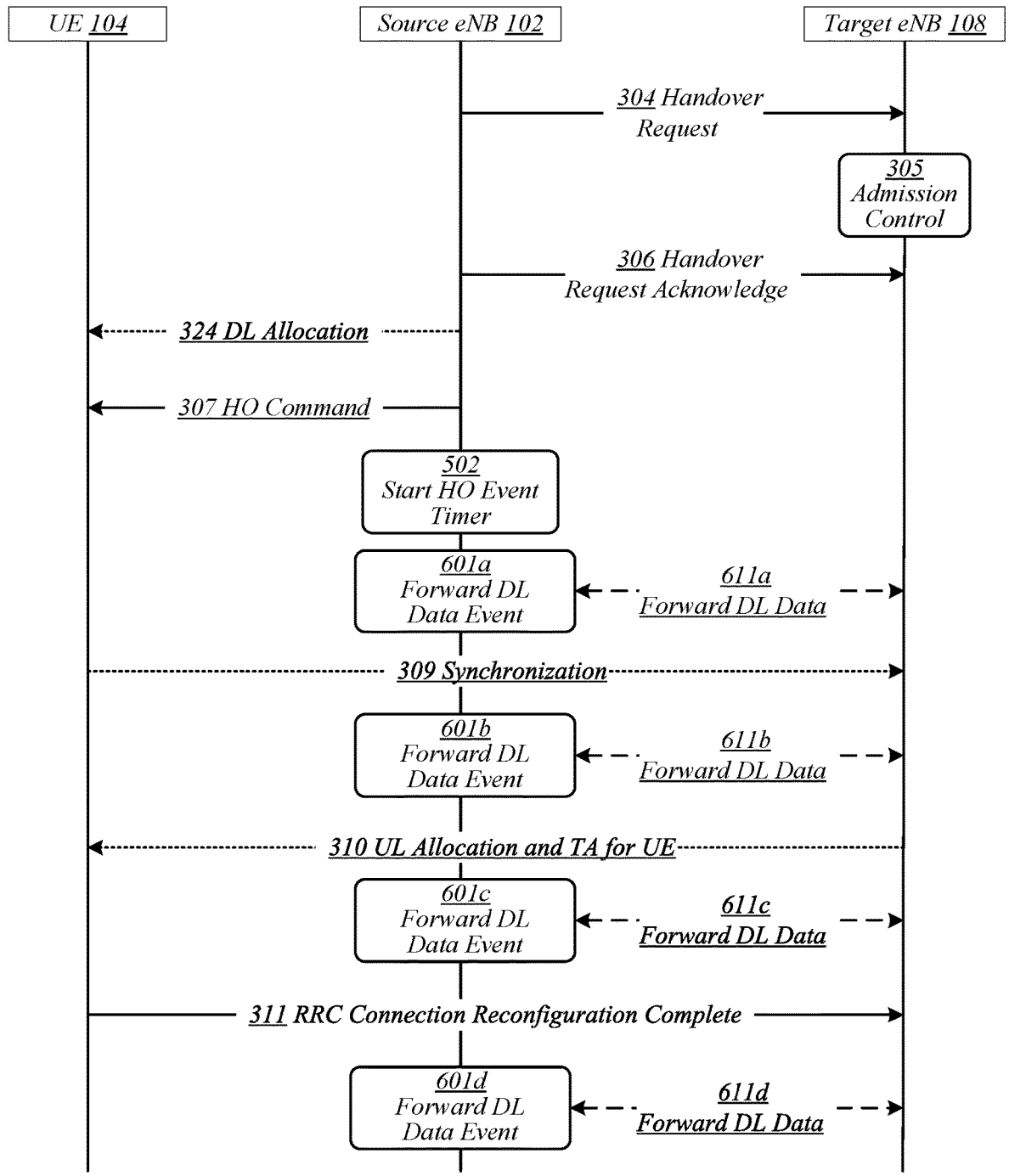
FIG. 6 illustrates an embodiment of a fourth communications flow.

FIG. 6 illustrates an example of a communications flow 600 that may be representative of the implementation of one or more HO processes according to some embodiments. More particularly, communications flow 600 may be representative of modifications to a portion of communications flow 300 to implement forwarding of DL data from source eNB 102 to target eNB 108 according to some embodiments. Communication flow 600 depicts a portion of the elements of communications flow 300 of FIG. 3 to simplify the figure. Accordingly, an HO process configured according to various embodiments depicted in communications flow 600 may include additional HO process events depicted in communications flow 300 of FIG. 3.

As shown in FIG. 6, source eNB 102 may forward DL data to target eNB 108 at one of 611a-d responsive to a corresponding forward DL data event 601a-d. In various embodiments, DL data forwarded at 611a-d may include buffered DL data, DL data from SGW 110, combinations thereof, and/or the like. In various embodiments, source eNB 102 may detect an occurrence of a forward DL data event 601a-d by monitoring network communications, components, estimating a timing of an occurrence of an event, and/or the like. In various embodiments, a forward DL data event 601a-d may include an HO process event that triggers source eNB 102 to forward DL data to target eNB 108 during the HO process. Accordingly, source eNB 102 may have a plurality of options of forward DL data events 601a-d for initiating forwarding of DL data at one of 611a-d.

In various embodiments, forward DL data event 601a may include transmission of the HO command message to UE 104 at 307. In some embodiments, source eNB 102 may detect when source eNB 102 has transmitted the HO command to UE 104 at 307 and may operate to initiate forwarding of DL data to target eNB 108 at 611a. In various embodiments, source eNB 102 may initiate forwarding of DL data at 611a immediately or substantially immediately following 601a. In various embodiments, source eNB 102 may initiate forwarding of DL data at 611a responsive to expiration of a delay period following an occurrence of forward DL data event 601a.

In various embodiments, forward DL data event 601b may include performance of at least a portion of the RACH procedure by UE 104. For example, the portion of the RACH procedure may include initiation of the RACH procedure, completion of the RACH procedure, and/or transmission of a RACH message by UE 104 to target eNB 108 during the RACH procedure. In various embodiments, the RACH procedure may be performed by UE 104 during synchronization at 309. In some embodiments, in response to source eNB 102 detecting forward DL data event 601b, source eNB 102 may initiate forwarding of DL data to target eNB 108 at 611b.

In various embodiments, source eNB 102 may detect forward DL data event 601b by estimating when UE 104 may be operative in the portion of the RACH procedure during the HO process. For example, source eNB 102 may start an HO event timer during the HO process. In some embodiments, source eNB 102 may start the HO event timer after 307 or 308. Source eNB 102 may access the event estimate information to determine a time estimate of when UE 104 may perform the portion of the RACH procedure, for example, at 309. Accordingly, source eNB 102 may detect that forward DL data event 601b has occurred when the estimated time for UE 104 to perform the portion of the RACH procedure has transpired based on the HO event timer.

In various embodiments, forward DL data event 601c may include receipt of a RAR message by UE 104, for instance, during UL allocation and TA for UE at 310. In some embodiments, source eNB 102 may detect forward DL data event 601c by estimating when UE 104 has received the RAR message based on the event estimate information. Accordingly, in various embodiments, source eNB 102 may detect forward DL data event 601c by estimating receipt of a RAR message by UE 104 during an HO process. For example, source eNB 102 may start an HO event timer at an HO process event, such as 307 or 308. Source eNB 102 may access the event estimate information to determine an estimate of when UE 104 may receive the RAR message (for example, at 310) during the HO process. Accordingly, source eNB 102 may detect that forward DL data event 601c has occurred when the estimated time for UE 104 to receive the RAR message has transpired. In various embodiments, in response to source eNB 102 detecting forward DL data event 601c, source eNB 102 may initiate forwarding of DL data to target eNB 108 at 611c.

In various embodiments, forward DL data event 601d may include UE 104 establishing communication or otherwise obtaining access to target eNB 108. In various embodiments, source eNB 102 may detect forward DL data event 601d by estimating when UE has accessed target eNB 108 based on the event estimate information and/or an HO event timer. In some embodiments, source eNB 102 may estimate when UE 104 has accessed target eNB 108 by estimating one or more HO events corresponding to UE 104 accessing target eNB 108, including, without limitation, completion of a RACH procedure by UE 104, transmission of the RRC-ConnectionReconfigurationComplete message at 311, receipt of the UE context release message at 317, and/or the like.

In some embodiments, source eNB 102 may stop forwarding DL data to target eNB 108 responsive to detection of or estimation of an occurrence of various HO process events including, without limitation, referring to FIG. 3, any of 310-317. Although FIG. 6 depicts forward DL data events 601a-d associated with certain HO process events, embodiments are not so limited. For example, other forward DL data events associated with other HO process events may be implemented according to various embodiments. In another example, a forward DL data event may be associated with a plurality of HO process events required to transpire before triggering the stop DL data event. The embodiments are not limited in this context.

In some embodiments, source eNB 102 may be capable of detecting one or more of forward DL data events 601a-d. In some embodiments, one or more of forward DL data events 601a-d may be active and the remaining, if any, forward DL data events 601a-d may be inactive. In some embodiments, source eNB 102 may monitor for active forward DL data events 601a-d and may not monitor for inactive forward DL data events 601a-d. In some embodiments, source eNB 102 may activate an HO event timer for active forward DL data events 601a-d and may not activate an HO event timer for inactive forward DL data events 601a-d. In some embodiments, active forward DL data events 601a-d may trigger source eNB 102 to forward DL data to target eNB 108, and inactive stop forward DL data events 601a-d, even if detected by source eNB 102, may not trigger source eNB 102 to forward DL data to target eNB 108.

In various embodiments, selection of active and/or forward DL data events 601*a-d* may be determined by various network components, including, without limitation, source eNB 102, UE 104, MME 106, target eNB 108, SGW 110, and/or EPC components. In various embodiments, selection of active and/or inactive forward DL data events 601*a-d* may be selected based on one or more selection factors, including, without limitation, UE characteristics, eNB characteristics, network characteristics, UE performance, eNB performance, network performance, historical information, estimation success rate and/or probability, and/or the like.

FIG. 7 illustrates an example of a communications flow 700 that may be representative of the implementation of one or more HO processes according to some embodiments. More particularly, communications flow 700 may be representative of modifications to a portion of communications flow 300 to implement transmission of the SN status transfer message from source eNB 102 to target eNB 108 according to some embodiments. Communication flow 700 depicts a portion of the elements of communications flow 300 of FIG. 3 to simplify the figure. Accordingly, an HO process configured according to various embodiments depicted in communications flow 700 may include additional HO process events depicted in communications flow 300 of FIG. 3.

As shown in FIG. 7, source eNB 102 may transmit a SN status transfer message at one of 711*a-c* responsive to one of SN status transfer events 701*a-c*. In various embodiments, source eNB 102 may detect an occurrence of a SN status transfer event 701*a-c* by monitoring network communications, components, estimating a timing of an occurrence of an event, and/or the like. In various embodiments, a SN status transfer event 701*a-c* may include an HO process event that triggers source eNB 102 to transmit a SN status transfer message to target eNB 108 during the HO process. Accordingly, source eNB 102 may have a plurality of options of SN status transfer events 701*a-c* to trigger the transmission of the SN status transfer message during the HO process.

In various embodiments, source eNB 102 may determine that UE 104 has stopped receiving DL data at 704 and detect that SN status transfer event 701*a* has occurred. Source eNB 102 may determine that UE 104 has stopped receiving DL data at 704 using various techniques and/or information. For example, source eNB 102 may determine that DL data being forwarded to UE 104 by source eNB 102 is not being received by UE 104. In some embodiments, source eNB 102 may determine that UE 104 has stopped receiving packet data at 704 due to lack of a corresponding acknowledgment message from UE 104, or the like. In response to detecting SN status transfer event 701*a*, source eNB 102 may transmit the SN status transfer message to target eNB 108 at 711*a*. Although the determination that UE 104 has stopped receiving packet data at 704 is positioned in FIG. 7 after 307 and prior to 309, embodiments are not so limited, as the position of 704 in FIG. 7 is for illustrative purposes. In various embodiments, 704 may occur during various other positions within the HO process. For example, 704 may occur after 303, after 304, after 306, after 309, after 310, after 311, after 312, after 313, after 314, after 315, after 316, or after 317.

In various embodiments, SN status transfer event 701*b* may include UE 104 accessing target eNB 108. For example, source eNB 102 may estimate when UE 104 has accessed target eNB 108 based on an HO event timer and/or event estimate information. In various embodiments, for example, source eNB 102 may start an HO event timer at 307 and/or after 307 for an expected duration of 307-311. After this HO event timer has expired, source eNB 102 may determine that UE 104 has accessed target eNB 108 and may detect that SN status transfer event 701*b* has occurred. In response to detecting SN status transfer event 701*b*, source eNB 102 may transmit the SN status transfer message to target eNB 108 at 711*b*.

In various embodiments, SN status transfer event 701*c* may include target eNB 108 sending confirmation to source eNB 108 that UE 104 has successfully completed or substantially completed the HO process with target eNB 108. In various embodiments, source eNB 102 may detect that SN status transfer event 701*c* has occurred responsive to receiving the UE context release message from target eNB 108 at 317. In some embodiments, target eNB 108 may be configured to transmit an HO complete message to source eNB 102 at 602 to indicate that UE 104 has successfully completed or substantially completed the HO process with target eNB 108. In various embodiments, UE 104, MME 106, SGW 110, and/or the like may be configured to transmit the HO complete message to source eNB 102 at 602 indicating that UE 104 has successfully completed the HO process with target eNB 108. In response to detecting SN status transfer event 701*c*, source eNB 102 may transmit SN status transfer message to target eNB 108 at 711*c*.

In various embodiments, an HO process may include at least one of stop DL data events 501*a-e*, at least one of forward DL data events 601*a-d*, and/or at least one of SN status transfer events 701*a-c*. For example, communications flow 300 (or operation of source eNB 102 during communication flow 300) may be modified such that the transmission of DL data from source eNB 102 to UE is terminated based on a stop DL data event 501*a-e*, such that DL data is forwarded from source eNB 102 to target eNB 108 based on a forward DL data event 601*a-d*, and/or such that source eNB 102 transmits an SN status transfer message to target eNB 108 based on a SN status transfer event 701*a-c*.

In some embodiments, source eNB 102 may be capable of detecting one or more of SN status transfer events 701*a-c*. In some embodiments, one or more of SN status transfer events 701*a-c* may be active and the remaining, if any, SN status transfer events 701*a-c* may be inactive. In some embodiments, source eNB 102 may monitor for active SN status transfer events 701*a-c* and may not monitor for inactive SN status transfer events 701*a-c*. In some embodiments, source eNB 102 may activate an HO event timer for active SN status transfer events 701*a-c* and may not activate an HO event timer for inactive SN status transfer events 701*a-c*. In some embodiments, active SN status transfer events 701*a-c* may trigger source eNB 102 to transmit an SN status transfer message to target eNB 108, and inactive stop SN status transfer events 701*a-c*, even if detected by source eNB 102, may not trigger source eNB 102 to transmit an SN status transfer message to target eNB 108.

In various embodiments, selection of active and/or SN status transfer events 701*a-c* may be determined by various network components, including, without limitation, source eNB 102, UE 104, MME 106, target eNB 108, SGW 110, and/or EPC components. In various embodiments, selection of active and/or inactive SN status transfer events 701*a-c* may be selected based on one or more selection factors, including, without limitation, UE characteristics, eNB characteristics, network characteristics, UE performance, eNB performance, network performance, historical information, estimation success rate and/or probability, and/or the like.

Accordingly, an HO process according to some embodiments may include any of stop DL data events 501*a-e*, any of forward DL data events 601*a-d*, any of SN status transfer events 701*a-c*, and/or any combination thereof. In some embodiments, selection of the stop DL data events 501a-e, forward DL data events 601a-d, and SN status transfer events 701a-c monitored, detected, or otherwise associated with a source eNB 102 during an HO process may be determined by selectively activating and/or deactivating the stop DL data events 501a-e, forward DL data events 601a-d, and SN status transfer events 701a-c monitored. For example, an HO process according to some embodiments may include at least one of the following combinations of stop DL data events 501a-e, forward DL data events 601a-d, and/or SN status transfer events 701a-c: 501a; 501b; 501c; 501d; 501e; 601a; 601b; 601c; 601d; 701a; 701b; 701c; 501a and 601a; 501a and 601b; 501a and 601c; 501a and 601d; 501a and 701a; 501a and 701b; 501a and 701c; 501b and 601a; 501b and 601b; 501b and 601c; 501b and 601d; 501b and 701a; 501b and 701b; 501b and 701c; 501c and 601a; 501c and 601b; 501c and 601c; 501c and 601d; 501c and 701a; 501c and 701b; 501c and 701c; 501d and 601a; 501d and 601b; 501d and 601c; 501d and 601d; 501d and 701a; 501d and 701b; 501a and 701c; 501e and 601a; 501e and 601b; 501e and 601c; 501e and 601d; 501e and 701a; 501e and 701b; 501e and 701c; any of 501a-e, any of 601a-d, and any of 701a-e; and/or any combination thereof.

Prior to entering the HO process, UE 104 may be in a connected mode at 202 and connected to source eNB 102. In various embodiments, entering the connected mode may involve entering an RRC_CONNECTED state. In a conventional HO process, UE 104 detaches from source eNB 102 after receiving the HO command message from source eNB 102 (for instance, at 307 of FIG. 3) and message and data exchanges between UE 104 and source eNB 102 are terminated. More specifically, UE 104 detaches from source eNB 102 and enters an idle mode by transitioning from the RRC_CONNECTED state to an RRC_IDLE state. UE 104 may remain in the idle stat, referring to FIG. 3, from 307 until completion of 311, when UE 104 connects with target eNB 108. While in the idle mode during a conventional HO process, UE 104 cannot send or receive packet data, including DL data.

Accordingly, in various embodiments, operation of UE 104, source eNB 102, and/or target eNB 108 may be modified to facilitate the transmission of packet data and/or messages during an HO process. For example, operation of source eNB 102 during the HO process may be configured to be capable of transmitting DL data to UE 104 following transmission of the HO command to UE 104 at 307.

In some embodiments, source eNB 102 may buffer packets, may create duplicate packets, and/or may forward one copy of a packet to target eNB 102 and another copy of the packet to UE 104. Accordingly, in some embodiments, source eNB 102 may be configured to simultaneously transmit DL data to UE 104 and target eNB 108. In some embodiments, source eNB 102 may transmit DL data to UE 104 during the HO process over a different frequency, channel, and/or the like than a frequency, channel, window, and/or the like being used by UE 104 to establish communication with target eNB 108 (for example, during a RACH procedure).

In some embodiments, UE 104 and/or source eNB 102 may coordinate frequencies, channels, windows, and/or the like to reduce or eliminate interference and/or collisions due to transmission of DL data to UE 104, for example, during the RACH procedure. For example, source eNB 102 may estimate windows in which DL data may be sent to UE. In some embodiments, following establishing a connection with UE 104, target eNB 108 may selectively transmit buffered DL data to UE 104. For example, target eNB 108 may selectively transmit buffered DL data to UE 104 to avoid transmitting duplicate packets, for example, transmitted to UE 104 by source eNB 102 during the HO process.

In 3GPP LTE, security may be managed between UEs and eNBs using security keys (for instance, $K_{eNB}$). Conventional security and key management methods used in 3GPP LTE networks are described in 3GPP LTE TS 36.300 (for example, at section 14.1). In some embodiments, UE 104 may require a security key for communicating with target eNB 108 that is different than a security key used by UE 104 to communicate with source eNB 102. Accordingly, in various embodiments, source eNB 102, UE 104, and/or target eNB 108 may implement various key management methods to facilitate the transmission of DL data to UE, including the simultaneous transmission of DL data to UE 104 by source eNB 102 and target eNB 108. For example, UE 104 may use two security keys. A first security key may be used by UE 104 to maintain ongoing communications with source eNB 102 during the HO process (for example, from 530 to one of 501a-e of FIG. 5). A second security key may be generated for future communications between UE 104 and target eNB 108 during and/or after the HO process. In some embodiments, the first security key may be used for DRB communications with source eNB 102, and the second security key may be used for signal radio bearer (SRB) communications with target eNB 108. In some embodiments, UE 104 may replace the first security key with the second security key once the HO process is complete.

Figure 8:
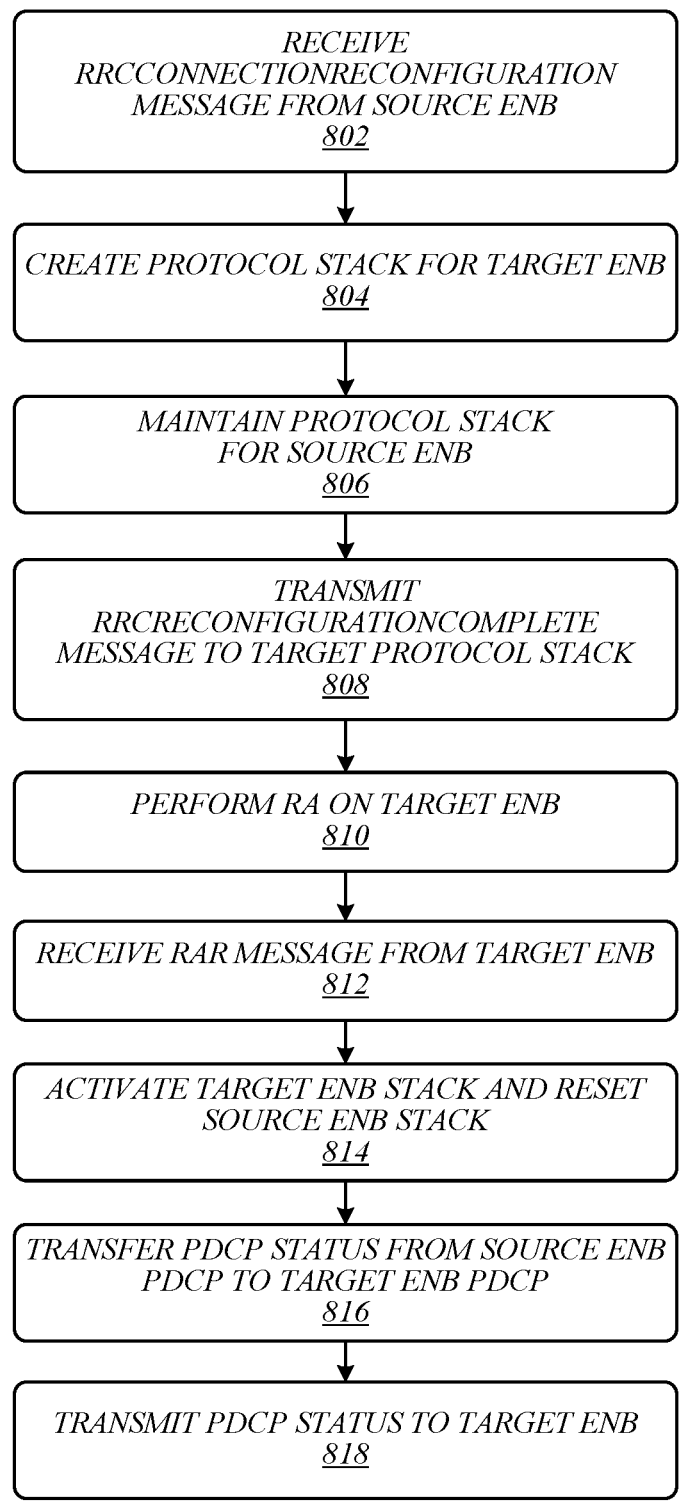
FIG. 8 illustrates an embodiment of a first logic flow.

FIG. 8 illustrates an example of a logic flow 800 that may be representative of some embodiments. More particularly, logic flow 800 may be representative of operations that may be performed in various embodiments by a UE, such as UE 104, in order to receive DL data from an eNB, such as source eNB 102, during the HO process.

As shown in FIG. 8, a UE may receive an RRCConnectionReconfiguration (including mobilityControlInformation) message from a source eNB at block 802. For example, UE 104 may receive an RRCConnectionReconfiguration (including mobilityControlInformation) message from source eNB 102, such as depicted at 307 of FIGS. 3-7.

Figure 9A:
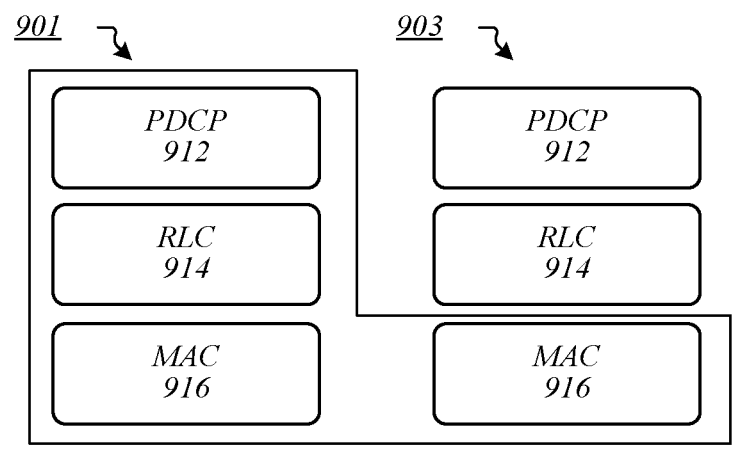
FIG. 9A illustrates an embodiment of a third operating environment.
Figure 9B:
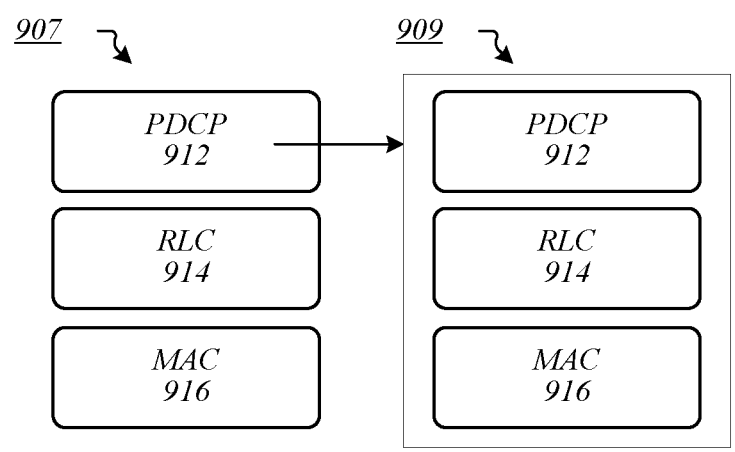
FIG. 9B illustrates an embodiment of a fourth operating environment.

Responsive to receiving the RRCConnectionReconfiguration (including mobilityControlInformation) message, the UE may create a protocol stack for a target eNB at block 804. Referring to FIGS. 9A and 9B, therein are depicted protocol stacks that may be created and/or maintained by UE 104 during the HO process for source eNB 102 and target eNB 108, for example, at block 804. FIG. 9A depicts an operating environment 900 that includes a source eNB protocol stack 901 and a target eNB protocol stack 903 according to a first embodiment. FIG. 9B depicts an operating environment 905 that includes a source eNB protocol stack 907 and a target eNB protocol stack 909 according to a second embodiment. Each of source eNB protocol stacks 901 and 907 and target eNB protocol stack 903 and 909 may include a Packet Data Convergence Protocol (PDCP) layer 912, a radio link control (RLC) layer 914, and a media access control (MAC) layer 916. The functions of PDCP, RLC, and MAC are described in 3GPP TS 36.300. PDCP is also described in 3GPP TS 36.323, entitled "Evolved Universal Terrestrial Radio Access (E-UTRA); Packet Data Convergence Protocol (PDCP) Specification." RLC is also described in 3GPP TS 36.322, entitled "Evolved Universal Terrestrial Radio Access (E-UTRA); Radio Link Control (RLC) Protocol Specification." The functions of MAC are also described in 3GPP TS 25.321, entitled "Medium Access Control (MAC) Protocol Specification." These documents are publicly available.

In some embodiments, certain of the layers of the protocol stacks may not be activated. For example, UE 104 may not activate the RLC and/or PDCP layers of the target eNB protocol stack 903 and 909 of FIG. 9A and FIG. 9B, respectively. Although FIGS. 9A and 9B depicts protocol stacks 901, 903, 907, and 909 that include PDCP 912, RLC 914, and MAC 916 layers, embodiments are not so limited, as UE 104 may operate to create and/or maintain protocol stacks with more or less layers. Embodiments are not limited in this context.

The UE may maintain a protocol stack for the source eNB at block 806. For example, UE 104 may not eliminate or completely eliminate a protocol stack used for source eNB 102 when UE detaches from source eNB (for instance, at 328 of FIG. 3). In some embodiments, the UE may create a protocol stack for the source eNB at block 806. Non-limiting examples of protocol stacks for the source eNB may include source eNB protocol stacks 901 and 907 of FIG. 9A and FIG. 9B, respectively.

At block 808, the UE may transmit an RRCConnectionReconfigurationComplete message to the target eNB stack in the UE. For example, UE 104 may transmit an RRCConnectionReconfigurationComplete message complete to target eNB stack 903 or 909 of FIG. 9A and FIG. 9B, respectively. Responsive to the target eNB stack receiving the RRCConnectionReconfigurationComplete message, the MAC layer in the target eNB stack in the UE may perform a random access (RA) process on the target eNB at block 810. For example, UE 104 may perform a RACH procedure to establish communication with target eNB 108. During the RA process, the UE may receive a RAR message from the target eNB at 812, for example, during the RACH procedure. Responsive to receiving the RAR message, the UE may activate the target eNB protocol stack and reset the source eNB protocol stack at 814. The UE may transfer the PDCP status from the source eNB PDCP to the target eNB PDCP at block 816. For example, referring to FIGS. 9A and 9B, responsive to establishing a connection with target eNB 108, UE 104 may transfer a PDCP status from PDCP layer 910 of the source eNB protocol stack 901 or 907 to PDCP layer 910 of the target eNB protocol stack 903 or 909. At block 818, the UE may transmit the PDCP status to the target eNB. For example, the PDCP status transferred to the PDCP layer 910 of the target eNB protocol stack 903 or 909 of UE 104 may be transmitted to target eNB 108, for instance, for facilitating UL data and/or DL data forwarding to UE 104.

Figure 10:
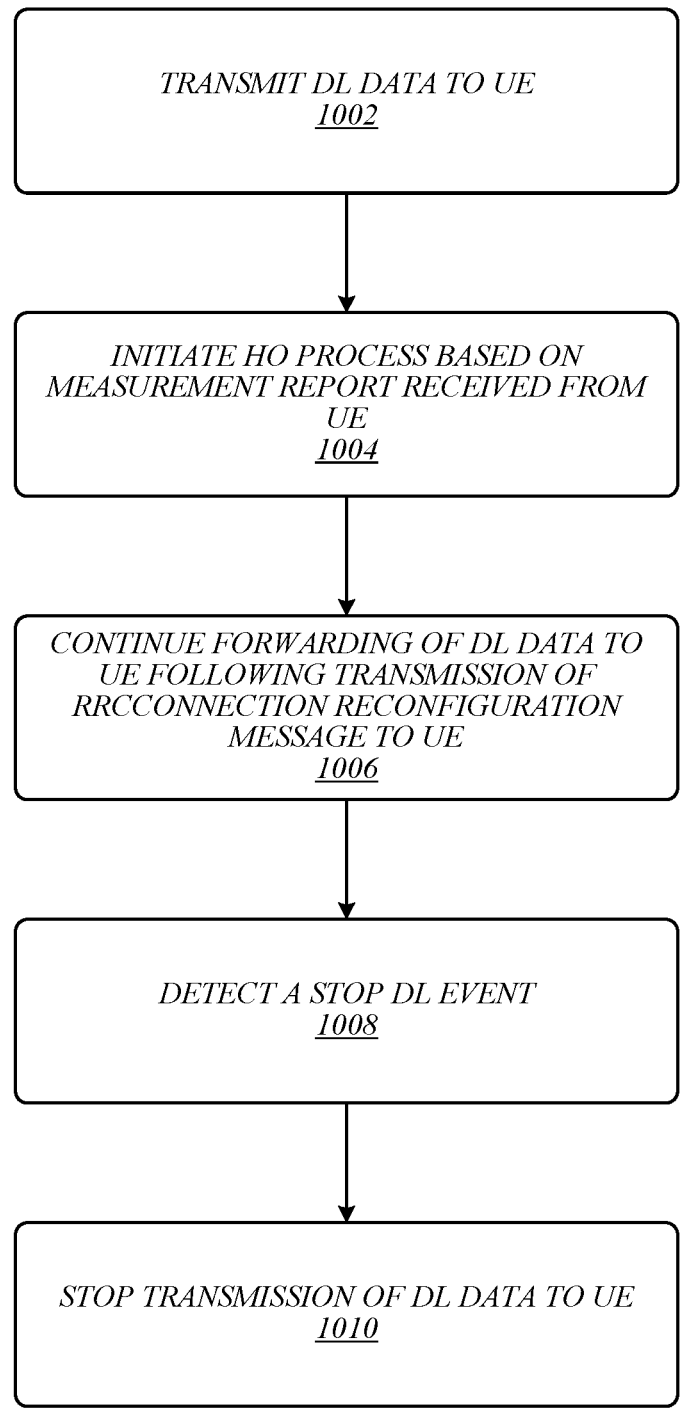
FIG. 10 illustrates an embodiment of a second logic flow.

FIG. 10 illustrates an example of a logic flow 1000 that may be representative of some embodiments. More particularly, logic flow 1000 may be representative of operations that may be performed in various embodiments by source eNB, such as source eNB 102, to maintain transmission of DL data to a UE, such as UE 104, during an HO process.

As shown in FIG. 10, the source eNB may transmit DL data to UE at 1002. For example, as shown in FIG. 3, source eNB 102 may be transmitting packet data 322 to UE 104 prior to initiation of an HO process. At 1004, the source eNB may initiate an HO process based on a measurement report received from the UE. For example, source eNB 102 may receive a measurement report from UE 102 at 302 indicating handover is required. Source eNB 102 may transmit a handover request to target eNB 108 at 304 to initiate an HO process. As part of the HO process, the source eNB may transmit an HO command to UE 104. The source eNB may continue to transmit DL data to the UE following transmission of the HO command to the UE at 1006.

The source eNB may detect a stop event at 1008. For example, referring to FIG. 5, source eNB 102 may detect an occurrence of one of stop DL data events 501*a*-*e*. In response to detecting a stop DL data event, the source eNB may stop transmission of the DL data to the UE at 1010.

Figure 11:
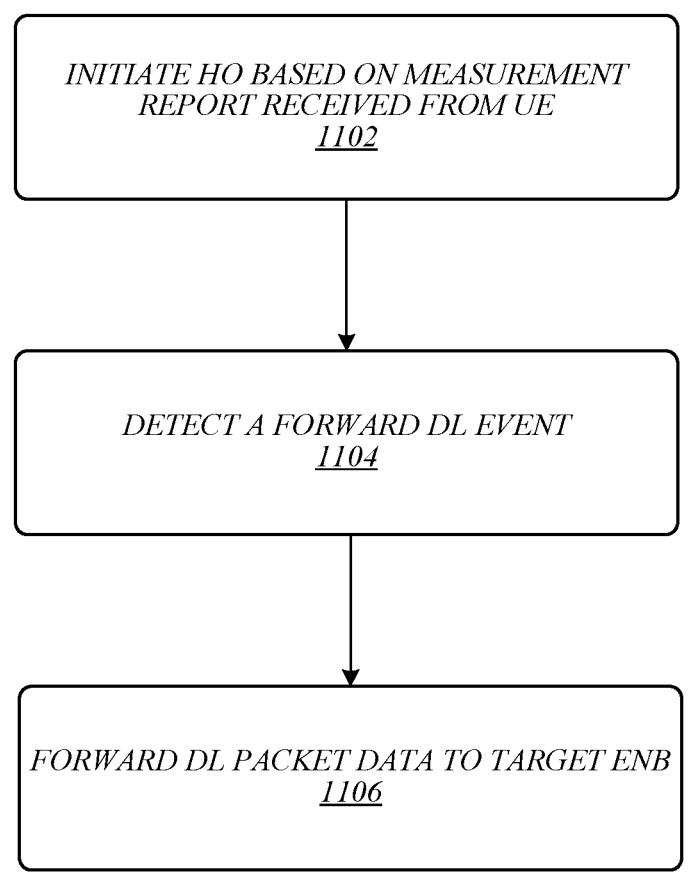
FIG. 11 illustrates an embodiment of a third logic flow.

FIG. 11 illustrates an example of a logic flow 1100 that may be representative of some embodiments. More particularly, logic flow 1100 may be representative of operations that may be performed in various embodiments by a source eNB, such as source eNB 102, to initiate forwarding of DL data received from a UE, such as UE 104, to a target eNB, such as target eNB 108, during an HO process.

As shown in FIG. 11, the source eNB may initiate an HO process based on a measurement report received from the UE at 1102. For example, referring to FIG. 3, source eNB 102 may receive a measurement report from UE 102 at 302 indicating handover is required. Source eNB 102 may transmit a handover request to target eNB 108 at 304 to initiate an HO process. The source eNB may detect a forward DL event at 1104. For example, referring to FIG. 6, source eNB 102 may detect an occurrence of one of forward DL events 601*a*-*d*. In response to detecting a forward DL event, the source eNB may initiate transmission of DL data to the target eNB at 1106.

Figure 12:
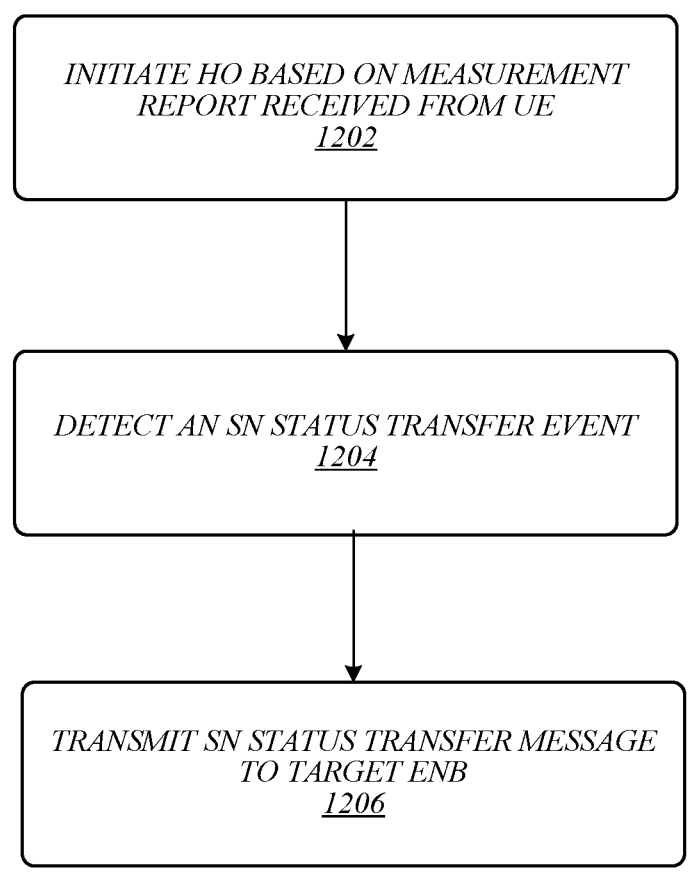
FIG. 12 illustrates an embodiment of a fourth logic flow.

FIG. 12 illustrates an example of a logic flow 1200 that may be representative of some embodiments. More particularly, logic flow 1200 may be representative of operations that may be performed in various embodiments by a source eNB, such as source eNB 102, to transmit an SN status transfer message to a target eNB, such as target eNB 108, during an HO process.

As shown in FIG. 12, the source eNB may initiate an HO process based on a measurement report received from the UE at 1202. For example, referring to FIG. 3, source eNB 102 may receive a measurement report from UE 102 at 302 indicating handover is required. Source eNB 102 may transmit a handover request to target eNB 108 at 304 to initiate an HO process. The source eNB may detect an SN status transfer event at 1204. For example, referring to FIG. 7, source eNB 102 may detect an occurrence of one of forward DL events 701*a*-*c*. In response to detecting a forward DL event, the source eNB may initiate transmission of the SN status transfer message to the target eNB at 1106.

Figure 13:
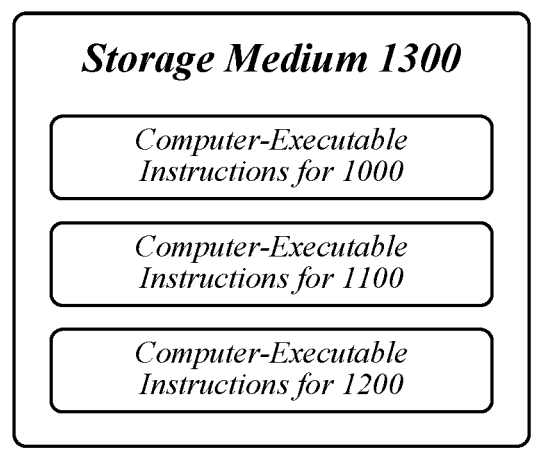
FIG. 13 illustrates an embodiment of a storage medium.

FIG. 13 illustrates an embodiment of a storage medium 1100. Storage medium 1100 may comprise any non-transitory computer-readable storage medium or machine-readable storage medium, such as an optical, magnetic or semiconductor storage medium. In various embodiments, storage medium 1300 may comprise an article of manufacture. In some embodiments, storage medium 1300 may store computer-executable instructions, such as computer-executable instructions to implement one or more of logic flow 1000 of FIG. 10, logic flow 1100 of FIG. 11, and logic flow 1200 of FIG. 12. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 14:
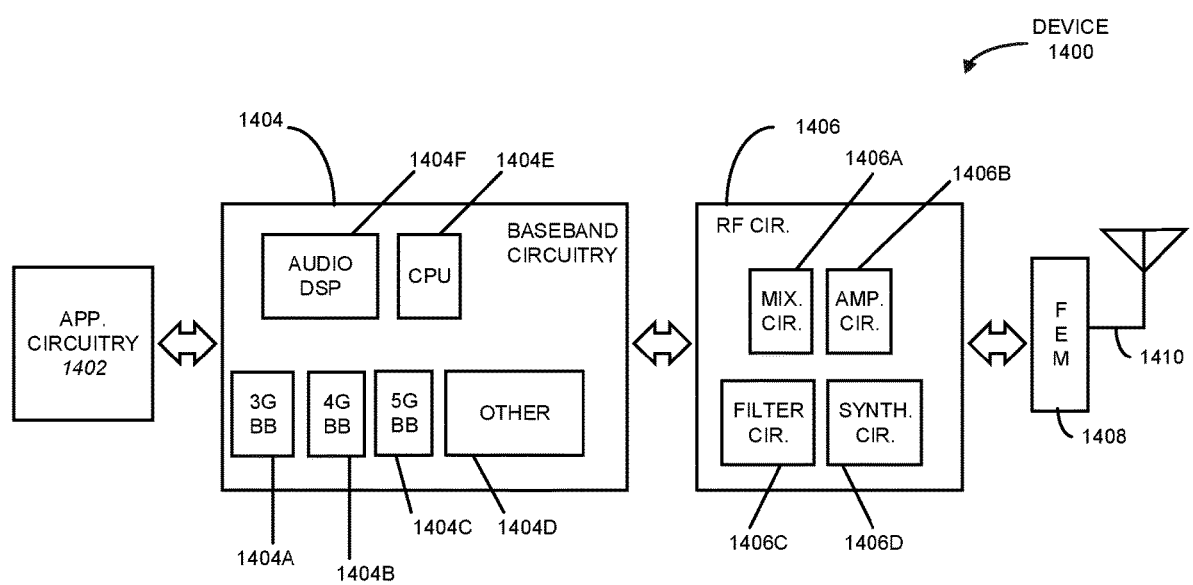
FIG. 14 illustrates an embodiment of user equipment.

FIG. 14 illustrates an example of a UE device 1400 that may be representative of a UE that implements one or more of the disclosed techniques in various embodiments. In some embodiments, the UE device 1400 may include application circuitry 1402, baseband circuitry 1404, Radio Frequency (RF) circuitry 1406, front-end module (FEM) circuitry 1408 and one or more antennas 1410, coupled together at least as shown.

The application circuitry 1402 may include one or more application processors. For example, the application circuitry 1402 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1404 may include circuitry such as, but not limited to, one or more single-core or multi-core processors. The baseband circuitry 1404 may include one or more baseband processors and/or control logic to process baseband signals received from a receive signal path of the RF circuitry 1406 and to generate baseband signals for a transmit signal path of the RF circuitry 1406. Baseband processing circuity 1404 may interface with the application circuitry 1402 for generation and processing of the baseband signals and for controlling operations of the RF circuitry 1406. For example, in some embodiments, the baseband circuitry 1404 may include a second generation (2G) baseband processor 1404*a*, third generation (3G) baseband processor 1404*b*, fourth generation (4G) baseband processor 1404*c*, and/or other baseband processor(s) 1404*d* for other existing generations, generations in development or to be developed in the future (e.g., fifth generation (5G), 6G, etc.). The baseband circuitry 1404 (e.g., one or more of baseband processors 1404*a-d*) may handle various radio control functions that enable communication with one or more radio networks via the RF circuitry 1406. The radio control functions may include, but are not limited to, signal modulation/demodulation, encoding/decoding, radio frequency shifting, etc. In some embodiments, modulation/demodulation circuitry of the baseband circuitry 1404 may include Fast-Fourier Transform (FFT), precoding, and/or constellation mapping/demapping functionality. In some embodiments, encoding/decoding circuitry of the baseband circuitry 1404 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1404 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1404*e* of the baseband circuitry 1404 may be configured to run elements of the protocol stack for signaling of the PHY, MAC, RLC, PDCP and/or RRC layers. In some embodiments, the baseband circuitry may include one or more audio digital signal processor(s) (DSP) 1404*f*. The audio DSP(s) 1404*f* may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1404 and the application circuitry 1402 may be implemented together such as, for example, on a system on a chip (SOC).

In some embodiments, the baseband circuitry 1404 may provide for communication compatible with one or more radio technologies. For example, in some embodiments, the baseband circuitry 1404 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 1404 is configured to support radio communications of more than one wireless protocol may be referred to as multi-mode baseband circuitry.

RF circuitry 1406 may enable communication with wireless networks using modulated electromagnetic radiation through a non-solid medium. In various embodiments, the RF circuitry 1406 may include switches, filters, amplifiers, etc. to facilitate the communication with the wireless network. RF circuitry 1406 may include a receive signal path which may include circuitry to down-convert RF signals received from the FEM circuitry 1408 and provide baseband signals to the baseband circuitry 1404. RF circuitry 1406 may also include a transmit signal path which may include circuitry to up-convert baseband signals provided by the baseband circuitry 1404 and provide RF output signals to the FEM circuitry 1408 for transmission.

In some embodiments, the RF circuitry 1406 may include a receive signal path and a transmit signal path. The receive signal path of the RF circuitry 1406 may include mixer circuitry 1406*a*, amplifier circuitry 1406*b* and filter circuitry 1406*c*. The transmit signal path of the RF circuitry 1406 may include filter circuitry 1406*c* and mixer circuitry 1406*a*. RF circuitry 1406 may also include synthesizer circuitry 1406*d* for synthesizing a frequency for use by the mixer circuitry 1406*a* of the receive signal path and the transmit signal path. In some embodiments, the mixer circuitry 1406*a* of the receive signal path may be configured to down-convert RF signals received from the FEM circuitry 1408 based on the synthesized frequency provided by synthesizer circuitry 1406*d*. The amplifier circuitry 1406*b* may be configured to amplify the down-converted signals and the filter circuitry 1406*c* may be a low-pass filter (LPF) or band-pass filter (BPF) configured to remove unwanted signals from the down-converted signals to generate output baseband signals. Output baseband signals may be provided to the baseband circuitry 1404 for further processing. In some embodiments, the output baseband signals may be zero-frequency baseband signals, although this is not a requirement. In some embodiments, mixer circuitry 1406*a* of the receive signal path may comprise passive mixers, although the scope of the embodiments is not limited in this respect.

In some embodiments, the mixer circuitry 1406*a* of the transmit signal path may be configured to up-convert input baseband signals based on the synthesized frequency provided by the synthesizer circuitry 1406*d* to generate RF output signals for the FEM circuitry 1408. The baseband signals may be provided by the baseband circuitry 1404 and may be filtered by filter circuitry 1406*c*. The filter circuitry 1406*c* may include a low-pass filter (LPF), although the scope of the embodiments is not limited in this respect.

In some embodiments, the mixer circuitry 1406*a* of the receive signal path and the mixer circuitry 1406*a* of the transmit signal path may include two or more mixers and may be arranged for quadrature downconversion and/or upconversion respectively. In some embodiments, the mixer circuitry 1406*a* of the receive signal path and the mixer circuitry 1406a of the transmit signal path may include two or more mixers and may be arranged for image rejection (e.g., Hartley image rejection). In some embodiments, the mixer circuitry 1406a of the receive signal path and the mixer circuitry 1406a may be arranged for direct downconversion and/or direct upconversion, respectively. In some embodiments, the mixer circuitry 1406a of the receive signal path and the mixer circuitry 1406a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1406 may include analog-to-digital converter (ADC) and digital-to-analog converter (DAC) circuitry and the baseband circuitry 1404 may include a digital baseband interface to communicate with the RF circuitry 1406.

In some dual-mode embodiments, a separate radio IC circuitry may be provided for processing signals for each spectrum, although the scope of the embodiments is not limited in this respect.

In some embodiments, the synthesizer circuitry 1406d may be a fractional-N synthesizer or a fractional N/N+1 synthesizer, although the scope of the embodiments is not limited in this respect as other types of frequency synthesizers may be suitable. For example, synthesizer circuitry 1406d may be a delta-sigma synthesizer, a frequency multiplier, or a synthesizer comprising a phase-locked loop with a frequency divider.

The synthesizer circuitry 1406d may be configured to synthesize an output frequency for use by the mixer circuitry 1406a of the RF circuitry 1406 based on a frequency input and a divider control input. In some embodiments, the synthesizer circuitry 1406d may be a fractional N/N+1 synthesizer.

In some embodiments, frequency input may be provided by a voltage controlled oscillator (VCO), although that is not a requirement. Divider control input may be provided by either the baseband circuitry 1404 or the applications processor 1402 depending on the desired output frequency. In some embodiments, a divider control input (e.g., N) may be determined from a look-up table based on a channel indicated by the applications processor 1402.

Synthesizer circuitry 1406d of the RF circuitry 1406 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1406d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1406 may include an IQ/polar converter.

FEM circuitry 1408 may include a receive signal path which may include circuitry configured to operate on RF signals received from one or more antennas 1410, amplify the received signals and provide the amplified versions of the received signals to the RF circuitry 1406 for further processing. FEM circuitry 1408 may also include a transmit signal path which may include circuitry configured to amplify signals for transmission provided by the RF circuitry 1406 for transmission by one or more of the one or more antennas 1410.

In some embodiments, the FEM circuitry 1408 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1406). The transmit signal path of the FEM circuitry 1408 may include a power amplifier (PA) to amplify input RF signals (e.g., provided by RF circuitry 1406), and one or more filters to generate RF signals for subsequent transmission (e.g., by one or more of the one or more antennas 1410.

In some embodiments, the UE device 1400 may include additional elements such as, for example, memory/storage, display, camera, sensor, and/or input/output (I/O) interface.

Figure 15:
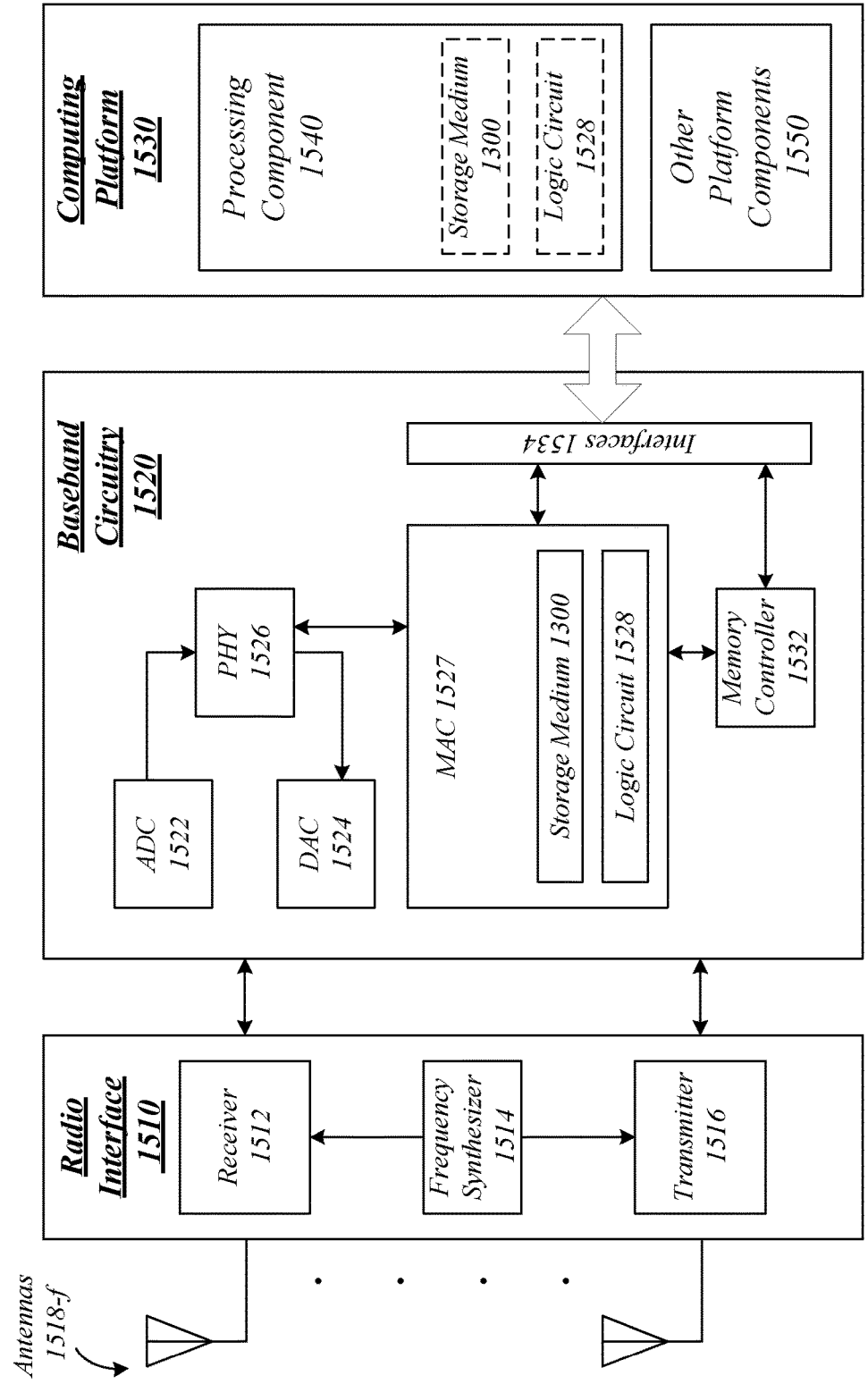
FIG. 15 illustrates an embodiment of a device.

FIG. 15 illustrates an embodiment of a communications device 1500 that may implement one or more of eNB 102, UE 104, MME 106, and eNB 108 of FIGS. 1-7, source eNB protocol stacks 901 and 907 of FIG. 9A, target eNB protocol stacks 907 and 909 of FIG. 9B, logic flow 1000 of FIG. 10, logic flow 1100 of FIG. 11, logic flow 1200 of FIG. 12, and storage medium 1300 of FIG. 11. In various embodiments, device 1500 may comprise a logic circuit 1528. The logic circuit 1228 may include physical circuits to perform operations described for one or more of eNB 102, UE 104, MME 106, and eNB 108 of FIGS. 1-7, source eNB protocol stacks 901 and 907 of FIG. 9A, target eNB protocol stacks 907 and 909 of FIG. 9B, logic flow 1000 of FIG. 10, logic flow 1100 of FIG. 11, and logic flow 1200 of FIG. 12, for example. As shown in FIG. 15, device 1500 may include a radio interface 1510, baseband circuitry 1520, and computing platform 1530, although the embodiments are not limited to this configuration.

The device 1500 may implement some or all of the structure and/or operations for one or more of eNB 102, UE 104, MME 106, and eNB 108 of FIGS. 1-7, source eNB protocol stacks 901 and 907 of FIG. 9A, target eNB protocol stacks 907 and 909 of FIG. 9B, logic flow 1000 of FIG. 10, logic flow 1100 of FIG. 11, logic flow 1200 of FIG. 12, and logic circuit 1528 in a single computing entity, such as entirely within a single device. Alternatively, the device 1500 may distribute portions of the structure and/or operations for one or more of eNB 102, UE 104, MME 106, and eNB 108 of FIGS. 1-7, source eNB protocol stacks 901 and 907 of FIG. 9A, target eNB protocol stacks 907 and 909 of FIG. 9B, logic flow 1000 of FIG. 10, logic flow 1100 of FIG. 11, logic flow 1200 of FIG. 12, and logic circuit 1228 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1510 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 1510 may include, for example, a receiver 1514, a frequency synthesizer 1514, and/or a transmitter 1516. Radio interface 1510 may include bias controls, a crystal oscillator and/or one or more antennas 1518-f. In another embodiment, radio interface 1510 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1520 may communicate with radio interface 1510 to process receive and/or transmit signals and may include, for example, a mixer for down-converting received RF signals, an analog-to-digital converter 1522 for converting analog signals to digital form, a digital-to-analog converter 1524 for converting digital signals to analog form, and a mixer for up-converting signals for transmission. Further, baseband circuitry 1520 may include a baseband or physical layer (PHY) processing circuit 1526 for PHY link layer processing of respective receive/transmit signals. Baseband circuitry 1520 may include, for example, a medium access control (MAC) processing circuit 1527 for MAC/data link layer processing. Baseband circuitry 1520 may include a memory controller 1532 for communicating with MAC processing circuit 1527 and/or a computing platform 1530, for example, via one or more interfaces 1534.

In some embodiments, PHY processing circuit 1526 may include a frame construction and/or detection module, in combination with additional circuitry such as a buffer memory, to construct and/or deconstruct communication frames. Alternatively or in addition, MAC processing circuit 1527 may share processing for certain of these functions or perform these processes independent of PHY processing circuit 1526. In some embodiments, MAC and PHY processing may be integrated into a single circuit.

The computing platform 1530 may provide computing functionality for the device 1500. As shown, the computing platform 1530 may include a processing component 1540. In addition to, or alternatively of, the baseband circuitry 1520, the device 1500 may execute processing operations or logic for one or more of eNB 102, UE 104, MME 106, and eNB 108 of FIGS. 1-7, source eNB protocol stacks 901 and 907 of FIG. 9A, target eNB protocol stacks 907 and 909 of FIG. 9B, logic flow 1000 of FIG. 10, logic flow 1100 of FIG. 11, logic flow 1200 of FIG. 12, and logic circuit 1228 using the processing component 1240. The processing component 1540 (and/or PHY 1526 and/or MAC 1527) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1530 may further include other platform components 1550. Other platform components 1550 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1500 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 1500 described herein, may be included or omitted in various embodiments of device 1500, as suitably desired.

Embodiments of device 1500 may be implemented using single input single output (SISO) architectures. However, certain implementations may include multiple antennas (e.g., antennas 1518-*f*) for transmission and/or reception using adaptive antenna techniques for beamforming or spatial division multiple access (SDMA) and/or using MIMO communication techniques.

The components and features of device 1500 may be implemented using any combination of discrete circuitry, application specific integrated circuits (ASICs), logic gates and/or single chip architectures. Further, the features of device 1500 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1500 shown in the block diagram of FIG. 15 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 16:
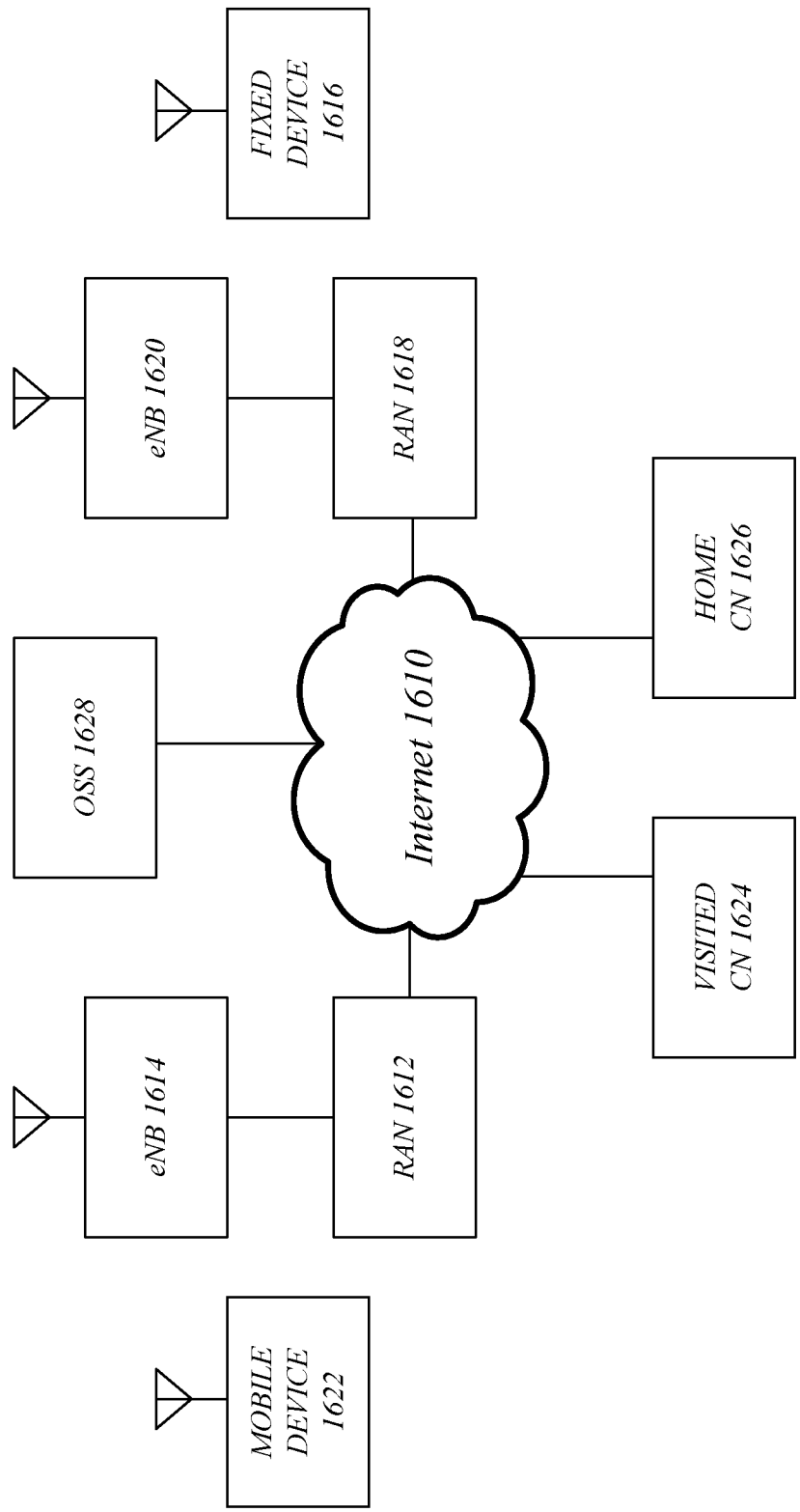
FIG. 16 illustrates an embodiment of a wireless network.

FIG. 16 illustrates an embodiment of a broadband wireless access system 1600. As shown in FIG. 1, broadband wireless access system 1600 may be an internet protocol (IP) type network comprising an internet 1610 type network or the like that is capable of supporting mobile wireless access and/or fixed wireless access to internet 1610. In one or more embodiments, broadband wireless access system 1600 may comprise any type of orthogonal frequency division multiple access (OFDMA)-based or single-carrier frequency division multiple access (SC-FDMA)-based wireless network, such as a system compliant with one or more of the 3GPP LTE Specifications and/or IEEE 802.16 Standards, and the scope of the claimed subject matter is not limited in these respects.

In the exemplary broadband wireless access system 1600, radio access networks (RANs) 1612 and 1618 are capable of coupling with evolved node Bs (eNBs) 1614 and 1620, respectively, to provide wireless communication between one or more fixed devices 1616 and internet 1610 and/or between or one or more mobile devices 1622 and Internet 1610. One example of a fixed device 1616 and a mobile device 1622 is device 1400 of FIG. 14, with the fixed device 1616 comprising a stationary version of device 1400 and the mobile device 1622 comprising a mobile version of device 1400. RANs 1612 and 1618 may implement profiles that are capable of defining the mapping of network functions to one or more physical entities on broadband wireless access system 1600. eNBs 1614 and 1620 may comprise radio equipment to provide RF communication with fixed device 1616 and/or mobile device 1622, such as described with reference to device 1400, and may comprise, for example, the PHY and MAC layer equipment in compliance with a 3GPP LTE Specification or an IEEE 802.16 Standard. eNBs 1614 and 1620 may further comprise an IP backbone to couple to Internet 1610 via RANs 1612 and 1618, respectively, although the scope of the claimed subject matter is not limited in these respects.

Broadband wireless access system 1600 may further comprise a visited core network (CN) 1624 and/or a home CN 1626, each of which may be capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CN 1624 and/or home CN 1626, and the scope of the claimed subject matter is not limited in these respects. Visited CN 1624 may be referred to as a visited CN in the case where visited CN 1624 is not part of the regular service provider of fixed device 1616 or mobile device 1622, for example where fixed device 1616 or mobile device 1622 is roaming away from its respective home CN 1626, or where broadband wireless access system 1600 is part of the regular service provider of fixed device 1616 or mobile device 1622 but where broadband wireless access system 1600 may be in another location or state that is not the main or home location of fixed device 1616 or mobile device 1622. The embodiments are not limited in this context.

Fixed device 1616 may be located anywhere within range of one or both of eNBs 1614 and 1620, such as in or near a home or business to provide home or business customer broadband access to Internet 1610 via eNBs 1614 and 1620 and RANs 1612 and 1618, respectively, and home CN 1626. It is worthy of note that although fixed device 1616 is generally disposed in a stationary location, it may be moved to different locations as needed. Mobile device 1622 may be utilized at one or more locations if mobile device 1622 is within range of one or both of eNBs 1614 and 1620, for example. In accordance with one or more embodiments, operation support system (OSS) 1628 may be part of broadband wireless access system 1600 to provide management functions for broadband wireless access system 1600 and to provide interfaces between functional entities of broadband wireless access system 1600. Broadband wireless access system 1600 of FIG. 16 is merely one type of wireless network showing a certain number of the components of broadband wireless access system 1600, and the scope of the claimed subject matter is not limited in these respects.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is an apparatus, comprising at least one memory and logic for a source evolved node B (eNB), at least a portion of the logic comprised in hardware coupled to the at least one memory, the logic to initiate a handover (HO) process via a handover command to handover a user equipment (UE) to a target eNB, provide downlink (DL) data to the UE following transmission of the HO command, and terminate providing the DL data to the UE responsive to detecting a stop DL data event.

Example 2 is the apparatus of Example 1, the stop DL data event comprising at least one of transmission of a sequence number (SN) status transfer message, loss of acknowledgment for DL data from the UE, loss of status report from the UE, performance of at least a portion of a random access channel (RACH) procedure by the UE, the UE successfully accessing the target eNB, the source eNB receiving a message from the UE indicating to stop forwarding DL data, and the source eNB receiving a message from the target eNB indicating to stop forwarding DL data.

Example 3 is the apparatus of Example 1, the stop DL data event comprising transmission of a sequence number (SN) status transfer message.

Example 4 is the apparatus of Example aim 1, the stop DL data event comprising loss of acknowledgment for DL data from the UE.

Example 5 is the apparatus of Example 1, the stop DL data event comprising loss of status report from the UE.

Example 6 is the apparatus of Example 1, the stop DL data event comprising performance of at least a portion of a random access channel (RACH) procedure by the UE.

Example 7 is the apparatus of Example 1, the stop DL data event comprising the UE successfully accessing the target eNB.

Example 8 is the apparatus of Example 1, the stop DL data event comprising the source eNB receiving a message from the UE indicating to stop forwarding DL data.

Example 9 is the apparatus of Example 1, the stop DL data event comprising the source eNB receiving a message from a target eNB indicating to stop forwarding DL data.

Example 10 is the apparatus of Example 1, the logic to detect the stop DL data event by estimating an occurrence of an HO event during the HO process.

Example 11 is the apparatus of Example 10, the logic to initiate an HO event timer and access event estimate information to estimate the occurrence of the HO event.

Example 12 is the apparatus of Example aim 10, the logic to access event estimate information to estimate the occurrence of the HO event.

Example 13 is the apparatus of Example 12, the event estimate information comprising an expected time duration from a first event to a second event.

Example 14 is the apparatus of Example 12, the event estimate information based on at least one of historical performance information, third-party estimate information, network component characteristics, and network characteristics.

Example 15 is the apparatus of Example 1, the logic to provide DL data to the target eNB responsive to detecting a forward DL data event during the HO process.

Example 16 is the apparatus of Example 15, the forward DL data event comprising at least one of transmission of the HO command to the UE, performance of at least a portion of a random access channel (RACH) procedure by the UE, receipt of a random access response (RAR) message by the UE, and the UE accessing the target eNB.

Example 17 is the apparatus of Example 15, the forward DL data event comprising transmission of the HO command to the UE.

Example 18 is the apparatus of Example 15, the forward DL data event comprising performance of at least a portion of a random access channel (RACH) procedure by the UE.

Example 19 is the apparatus of Example 15, the forward DL data event comprising receipt of a random access response (RAR) message by the UE.

Example 20 is the apparatus of Example 15, the forward DL data event comprising the UE accessing the target eNB.

Example 21 is the apparatus of Example 1, the logic to provide a sequence number (SN) transfer message to the target eNB responsive to detecting an SN status transfer event during the HO process.

Example 22 is the apparatus of Example 21, the SN status transfer event comprising at least one of the UE not receiving packet data, the UE accessing the target eNB, and the target eNB sending confirmation to the source eNB that the UE has completed the HO process.

Example 23 is the apparatus of Example 21, the SN status transfer event comprising the UE not receiving packet data.

Example 24 is the apparatus of Example 21, the SN status transfer event comprising the UE accessing the target eNB.

Example 25 is the apparatus of Example 21, the SN status transfer event comprising the target eNB sending confirmation to the source eNB that the UE has completed the HO process.

Example 26 is the apparatus of Example 1, the logic to provide DL data to the target eNB responsive to detecting a forward DL data event during the HO process, and provide a sequence number (SN) transfer message to the target eNB responsive to detecting an SN status transfer event during the HO process.

Example 27 is the apparatus of Example 26, the logic to detect at least one of the forward DL data event and the SN status transfer event by estimating an occurrence of an HO event during the HO process.

Example 28 is a system, comprising an apparatus according to any of Examples 1 to 27, and at least one radio frequency (RF) transceiver.

Example 29 is a method of handing over a user equipment (UE) from a source evolved node B (eNB) to a target eNB during a handover (HO) process, comprising, providing downlink (DL) data to the UE subsequent to an HO command initiating the HO process, detecting a stop DL data event, and terminating providing the DL data to the UE responsive to detecting the stop DL data event.

Example 30 is the method of Example 29, the stop DL data event comprising at least one of transmission of a sequence number (SN) status transfer message, loss of acknowledgment for DL data from the UE, loss of status report from the UE, performance of at least a portion of a random access channel (RACH) procedure by the UE, the UE successfully accessing the target eNB, the source eNB receiving a message from the UE indicating to stop forwarding DL data, and the source eNB receiving a message from the target eNB indicating to stop forwarding DL data.

Example 31 is the method of Example 29, the stop DL data event comprising transmission of a sequence number (SN) status transfer message.

Example 32 is the method of Example 29, the stop DL data event comprising loss of acknowledgment for DL data from the UE.

Example 33 is the method of Example 29, the stop DL data event comprising loss of status report from the UE.

Example 34 is the method of Example 29, the stop DL data event comprising performance of at least a portion of a random access channel (RACH) procedure by the UE.

Example 35 is the method of Example 29, the stop DL data event comprising the UE successfully accessing the target eNB.

Example 36 is the method of Example 29, the stop DL data event comprising the source eNB receiving a message from the UE indicating to stop forwarding DL data.

Example 37 is the method of Example 29, the stop DL data event comprising the source eNB receiving a message from a target eNB indicating to stop forwarding DL data.

Example 38 is the method of Example 29, comprising estimating an occurrence of an HO event during the HO process to detect the stop DL data event.

Example 39 is the method of Example 38, comprising initiating an HO event timer and accessing event estimate information to estimate an occurrence of the HO event during the HO process.

Example 40 is the method of Example 38, comprising accessing event estimate information to estimate an occurrence of the HO event during the HO process.

Example 41 is the method of Example 40, the event estimate information comprising an expected time duration from a first event to a second event.

Example 42 is the method of Example 40, the event estimate information based on at least one of historical performance information, third-party estimate information, network component characteristics, and network characteristics.

Example 43 is the method of Example 29, comprising providing DL data to the target eNB responsive to detecting a forward DL data event during the HO process.

Example 44 is the method of Example 43, the forward DL data event comprising at least one of transmission of the HO command to the UE, performance of at least a portion of a random access channel (RACH) procedure by the UE, receipt of a random access response (RAR) message by the UE, and the UE accessing the target eNB.

Example 45 is the method of Example 43, the forward DL data event comprising transmission of the HO command to the UE.

Example 46 is the method of Example 43, the forward DL data event comprising performance of at least a portion of a random access channel (RACH) procedure by the UE.

Example 47 is the method of Example 43, the forward DL data event comprising receipt of a random access response (RAR) message by the UE.

Example 48 is the method of Example 43, the forward DL data event comprising the UE accessing the target eNB.

Example 49 is the method of Example 29, comprising providing a sequence number (SN) transfer message to the target eNB responsive to detecting an SN status transfer event during the HO process.

Example 50 is the method of Example 49, the SN status transfer event comprising at least one of the UE not receiving packet data, the UE accessing the target eNB, and the target eNB sending confirmation to the source eNB that the UE has completed the HO process.

Example 51 is the method of Example 49, the SN status transfer event comprising the UE not receiving packet data.

Example 52 is the method of Example 49, the SN status transfer event comprising the UE accessing the target eNB.

Example 53 is the method of Example 49, the SN status transfer event comprising target eNB sending confirmation to the source eNB that the UE has completed the HO process.

Example 54 is the method of Example 29, comprising providing DL data to the target eNB responsive to detecting a forward DL data event during the HO process, and providing a sequence number (SN) transfer message to the target eNB responsive to detecting an SN status transfer event during the HO process.

Example 55 is the method of Example 54, comprising detecting at least one of the forward DL data event and the SN status transfer event by estimating an occurrence of an HO event during the HO process.

Example 56 is an apparatus comprising means to perform a method of handing over a UE from a source eNB to a target eNB during an HO process according to any of examples 29-55.

Example 57 is the apparatus of Example 56, comprising at least one radio frequency (RF) transceiver.

Example 58 is a computer-readable storage medium that stores instructions for execution by processing circuitry of an evolved node B (eNB), the instructions to cause the eNB to operate as a source eNB during a handover (HO) process handing over a user equipment (UE) to a target eNB, provide downlink (DL) data to the UE following transmission of an HO command to the UE, detect a stop DL data event during the HO process, and terminate providing of the DL data to the UE responsive to detecting the stop DL data event.

Example 59 is the computer-readable storage medium of Example 58, the stop DL data event comprising at least one of transmission of a sequence number (SN) status transfer message, loss of upload (UL) data transmission from the UE, performance of at least a portion of a random access channel (RACH) procedure by the UE, the UE successfully accessing the target eNB, the source eNB receiving a message from the UE indicating to stop forwarding DL data.

Example 60 is the computer-readable storage medium of Example 58, the stop DL data event comprising transmission of a sequence number (SN) status transfer message.

Example 61 is the computer-readable storage medium of Example 58, the stop DL data event comprising loss of acknowledgment for DL data from the UE.

Example 62 is the computer-readable storage medium of Example 58, the stop DL data event comprising loss of status report from the UE.

Example 63 is the computer-readable storage medium of Example 58, the stop DL data event comprising performance of at least a portion of a random access channel (RACH) procedure by the UE.

Example 64 is the computer-readable storage medium of Example 58, the stop DL data event comprising the UE successfully accessing the target eNB.

Example 65 is the computer-readable storage medium of Example 58, the stop DL data event comprising the source eNB receiving a message from the UE indicating to stop forwarding DL data.

Example 66 is the computer-readable storage medium of Example 58, the stop DL data event comprising the source eNB receiving a message from a target eNB indicating to stop forwarding DL data.

Example 67 is the computer-readable storage medium of Example 58, the instructions to cause the eNB to detect the stop DL data event by estimating an occurrence of an HO event during the HO process.

Example 68 is the computer-readable storage medium of Example 67, the instructions to cause the eNB to initiate an HO event timer to estimate the occurrence of the HO event.

Example 69 is the computer-readable storage medium of Example 67, the instructions to cause the eNB to access event estimate information to estimate the occurrence of the HO event.

Example 70 is the computer-readable storage medium of Example 69, the event estimate information comprising an expected time duration from a first event to a second event.

Example 71 is the computer-readable storage medium of Example 69, the event estimate information based on at least one of historical performance information, third-party estimate information, network component characteristics, and network characteristics.

Example 72 is the computer-readable storage medium of Example 58, the instructions to cause the eNB to forward DL data to the target eNB responsive to detecting a forward DL data event during the HO process.

Example 73 is the computer-readable storage medium of Example 72, the forward DL data event comprising at least one of transmission of the HO command to the UE, performance of at least a portion of a random access channel (RACH) procedure by the UE, receipt of a random access response (RAR) message by the UE, and the UE accessing the target eNB.

Example 74 is the computer-readable storage medium of Example 72, the forward DL data event comprising transmission of the HO command to the UE.

Example 75 is the computer-readable storage medium of Example 72, the forward DL data event comprising performance of at least a portion of a random access channel (RACH) procedure by the UE.

Example 76 is the computer-readable storage medium of Example 72, the forward DL data event comprising receipt of a random access response (RAR) message by the UE.

Example 77 is the computer-readable storage medium of Example 72, the forward DL data event comprising the UE accessing the target eNB.

Example 78 is the computer-readable storage medium of Example 58, the instructions to cause the eNB to transmit a sequence number (SN) transfer message to the target eNB responsive to detecting an SN status transfer event during the HO process.

Example 79 is the computer-readable storage medium of Example 78, the SN status transfer event comprising at least one of the UE not receiving packet data, the UE accessing the target eNB, and the target eNB sending confirmation to the source eNB that the UE has completed the HO process.

Example 80 is the computer-readable storage medium of Example 78, the SN status transfer event comprising the UE not receiving packet data.

Example 81 is the computer-readable storage medium of Example 78, the SN status transfer event comprising the UE accessing the target eNB.

Example 82 is the computer-readable storage medium of Example 78, the SN status transfer event comprising the target eNB sending confirmation to the source eNB that the UE has completed the HO process.

Example 83 is the computer-readable storage medium of Example 58, the instructions to cause the eNB to forward DL data to the target eNB responsive to detecting a forward DL data event during the HO process, and transmit a sequence number (SN) transfer message to the target eNB responsive to detecting an SN status transfer event during the HO process.

Example 84 is the computer-readable storage medium of Example 83, the instructions to cause the eNB to detect at least one of the forward DL data event and the SN status transfer event by estimating an occurrence of an HO event during the HO process.

Example 85 is an apparatus, comprising a transmission means for providing downlink (DL) data from a source evolved node B (eNB) to a user equipment (UE) subsequent to a handover (HO) command, the HO command to initiate an HO process, a detection means for detecting a stop DL data event, and a transmission termination means for terminating providing of the DL data to the UE responsive to detecting the stop DL data event.

Example 86 is the apparatus of Example 85, the stop DL data event comprising at least one of transmission of a sequence number (SN) status transfer message, loss of acknowledgment for DL data from the UE, loss of status report from the UE, performance of at least a portion of a random access channel (RACH) procedure by the UE, the UE successfully accessing a target eNB, the source eNB receiving a message from the UE indicating to stop forwarding DL data, and the source eNB receiving a message from the target eNB indicating to stop forwarding DL data.

Example 87 is the apparatus of Example 85, comprising an estimation means to estimate an occurrence of an HO event during the HO process.

Example 88 is the apparatus of Example 87, the estimation means to estimate the occurrence of the HO event by performing at least one of initiating an HO event timer and accessing event estimate information.

Example 89 is the apparatus of Example 85, the transmission means to transmit DL data to the target eNB responsive to detecting a forward DL data event during the HO process.

Example 90 is the apparatus of Example 89, the forward DL data event comprising at least one of transmission of the HO command to the UE, performance of at least a portion of a random access channel (RACH) procedure by the UE, receipt of a random access response (RAR) message by the UE, and the UE accessing the target eNB.

Example 91 is the apparatus of Example 85, the transmission means to transmit a sequence number (SN) transfer message to the target eNB responsive to detecting an SN status transfer event during the HO process.

Example 92 is the apparatus of Example 91, the SN status transfer event comprising at least one of the UE not receiving packet data, the UE accessing the target eNB, and the target eNB sending confirmation to the source eNB that the UE has completed the HO process.

Example 93 is an apparatus, comprising at least one memory and logic for a user equipment (UE), at least a portion of the logic comprised in hardware coupled to the at least one memory, the logic to initiate a handover (HO) process to handover the UE from a source evolved Node B (eNB) to a target eNB based on a handover (HO) command, and decode downlink (DL) data transmitted from the source eNB following receipt of the HO command by the UE.

Example 94 is the apparatus of Example 93, the logic to provide at least one UE message to the source eNB during the HO process.

Example 95 is the apparatus of Example 94, the UE message comprising instructions for the source eNB to stop transmitting DL data.

Example 96 is the apparatus of Example 94, the UE message comprising UE status information.

Example 97 is the apparatus of Example 93, the logic to provide a first security key for communication with the source eNB, and provide a second security key for communication with the target eNB.

Example 98 is the apparatus of Example 97, the logic to replace the first security key with the second security key responsive to completion of the HO process.

Example 99 is the apparatus of Example 97, the logic to use the first security key for data radio bearer (DRB) communications with the source eNB.

Example 100 is the apparatus of Example 97, the logic to use the second security key for signal radio bearer (SRB) communications with the source eNB.

Example 101 is the apparatus of Example 93, the logic to generate a first protocol stack for communicating with the source eNB during the HO process.

Example 102 is the apparatus of Example 93, the logic to maintain a first protocol stack for communicating with the source eNB during the HO process, the first protocol stack generated prior to the HO process.

Example 103 is the apparatus of Example 93, the logic to generate a second protocol stack for communicating with the target eNB during the HO process.

Example 104 is the apparatus of Example 103, the second protocol stack comprising a Packet Data Convergence Protocol (PDCP) layer, a radio link control (RLC) layer, and a media access control (MAC) layer.

Example 105 is the apparatus of Example 104, the logic to activate the MAC layer and not activate the PDCP layer and the RlC layer.

Example 106 is a system, comprising an apparatus according to any of Examples 93 to 105, and at least one radio frequency (RF) transceiver.

Example 107 is a method, comprising initiating an HO process at a user equipment (UE) to handover the UE from a source evolved Node B (eNB) to a target eNB based on a handover (HO) command, and decoding, via the UE, downlink (DL) data transmitted from the source eNB following receipt of the HO command by the UE.

Example 108 is the method of Example 107, comprising providing at least one UE message via the UE to the source eNB during the HO process.

Example 109 is the method of Example 108, the UE message comprising instructions for the source eNB to stop transmitting the DL data.

Example 110 is the method of Example 108, the UE message comprising UE status information.

Example 111 is the method of Example 107, comprising providing a first security key for communication with the source eNB, and providing a second security key for communication with the target eNB.

Example 112 is the method of Example 111, the logic to replace the first security key with the second security key responsive to completion of the HO process.

Example 113 is the method of Example 111, the logic to use the first security key for data radio bearer (DRB) communications with the source eNB.

Example 114 is the method of Example 111, the logic to use the second security key for signal radio bearer (SRB) communications with the source eNB.

Example 115 is the method of Example 107, comprising generating a first protocol stack for communicating with the source eNB during the HO process.

Example 116 is the method of Example 107, comprising maintaining a first protocol stack for communicating with the source eNB during the HO process, the first protocol stack generated prior to the HO process.

Example 117 is the method of Example 107, comprising generating a second protocol stack for communicating with the target eNB during the HO process.

Example 118 is the method of Example 117, the second protocol stack comprising a Packet Data. Convergence Protocol (PDCP) layer, a radio link control (RLC) layer, and a media access control (MAC) layer.

Example 119 is the method of Example 118, comprising activating the MAC layer and not activating the PDCP layer and the RLC layer.

Example 120 is an apparatus, comprising means to perform a method of handing over a user equipment (UE) from a source evolved node B (eNB) to a target eNB during a handover (HO) process according to any of Examples 107-119.

Example 121 is the apparatus of Example 120, comprising at least one radio frequency (RF) transceiver.

Example 122 is computer-readable storage medium that stores instructions for execution by processing circuitry of a user equipment (UE), the instructions to cause the UE to process a handover (HO) command provided by a source evolved Node B (eNB), initiate an HO process to handover the UE from the source eNB to a target eNB based on the HO command, and decode downlink (DL) data transmitted from the source eNB following receipt of the HO command by the UE.

Example 123 is the computer-readable storage medium of Example 122, the logic to provide at least one UE message to the source eNB during the HO process.

Example 124 is the computer-readable storage medium of Example 123, the UE message comprising instructions for the source eNB to stop transmitting DL data.

Example 125 is the computer-readable storage medium of Example 123, the UE message comprising UE status information.

Example 126 is the computer-readable storage medium of Example 122, the logic to provide a first security key for communication with the source eNB, and provide a second security key for communication with the target eNB.

Example 127 is the computer-readable storage medium of Example 126, the logic to replace the first security key with the second security key responsive to completion of the HO process.

Example 128 is the computer-readable storage medium of Example 126, the logic to use the first security key for data radio bearer (DRB) communications with the source eNB.

Example 129 is the computer-readable storage medium of Example 126, the logic to use the second security key for signal radio bearer (SRB) communications with the source eNB.

Example 130 is the computer-readable storage medium of Example 122, the logic to generate a first protocol stack for communicating with the source eNB during the HO process.

Example 131 is the computer-readable storage medium of Example 122, the logic to maintain a first protocol stack for communicating with the source eNB during the HO process, the first protocol stack generated prior to the HO process.

Example 132 is the computer-readable storage medium of Example 122, the logic to generate a second protocol stack for communicating with the target eNB during the HO process.

Example 133 is the computer-readable storage medium of Example 132, the second protocol stack comprising a Packet Data Convergence Protocol (PDCP) layer, a radio link control (RLC) layer, and a media access control (MAC) layer.

Example 134 is the computer-readable storage medium of Example 133, the logic to activate the MAC layer and not activate the PDCP layer and the RLC layer.

Example 135 is an apparatus, comprising a handover (HO) control means to initiate an HO process at a user equipment (UE), the HO process to handover the UE from a source evolved Node B (eNB) to a target eNB based on a handover (HO) command, and a downlink (DL) control means to decode downlink (DL) data transmitted from the source eNB following receipt of the HO command by the UE.

Example 136 is the apparatus of Example 135, comprising a messaging means to provide at least one UE message to the source eNB during the HO process.

Example 137 is the apparatus of Example 136, the UE message comprising instructions for the source eNB to stop transmitting DL data.

Example 138 is the apparatus of Example 136, the UE message comprising UE status information.

Example 139 is the apparatus of Example 135, comprising a security control means to provide a first security key for UE communication with the source eNB, and provide a second security key for UE communication with the target eNB.

Example 140 is the apparatus of Example 139, the security control means to replace the first security key with the second security key responsive to completion of the HO process.

Example 141 is the apparatus of Example 139, the security control means to use the first security key for data radio bearer (DRB) communications with the source eNB.

Example 142 is the apparatus of Example 139, the security control means to use the second security key for signal radio bearer (SRB) communications with the source eNB.

Example 143 is the apparatus of Example 135, comprising a protocol stack control means to generate a first protocol stack for communicating with the source eNB during the HO process.

Example 144 is the apparatus of Example 135, comprising a protocol stack control means to maintain a first protocol stack for communicating with the source eNB during the HO process, the first protocol stack generated prior to the HO process.

Example 145 is the apparatus of Example 135, comprising a protocol stack control means to generate a second protocol stack for communicating with the target eNB during the HO process.

Example 146 is the apparatus of Example 145, the second protocol stack comprising a Packet Data. Convergence Protocol (PDCP) layer, a radio link control (RLC) layer, and a media access control (MAC) layer.

Example 147 is the apparatus of Example 146, the protocol stack control means to activate the MAC layer and not activate the PDCP layer and the RLC layer.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus of a base station configured as a source base station, comprising:
    at least one memory; and
    logic for the source base station, the logic comprised in hardware coupled to the at least one memory, the logic configured to:
        initiate a handover (HO) process via a handover command to handover a user equipment (UE) to a target base station,
        provide downlink (DL) data to the UE following transmission of the HO command,
        initiate an HO event timer and access event estimate information to estimate the occurrence of the HO event, the event estimate information comprising an expected time duration between two time events or a time-of-day value;
        provide DL data to the target base station responsive to detecting a forward DL data event during the HO process;
        detect a stop DL data event by estimating an occurrence of an HO event during the HO process; and
        terminate providing the DL data to the UE responsive to detecting the stop DL data event, the stop DL data event comprising receipt of a message from the target base station that the UE receives DL data from the target base station.

2. The apparatus of claim 1, the forward DL data event comprising at least one of transmission of the HO command to the UE, performance of a random access channel (RACH) procedure by the UE, receipt of a random access response (RAR) message by the UE, and the UE accessing the target base station.

3. The apparatus of claim 1, the logic further configured to provide a sequence number (SN) transfer message to the target base station responsive to detecting an SN status transfer event during the HO process.

4. The apparatus of claim 3, the SN status transfer event comprising at least one of the UE not receiving packet data, the UE accessing the target base station, and the target base station sending confirmation to the source base station that the UE has completed the HO process.

5. A non-transitory computer-readable storage medium that stores instructions for execution by processing circuitry of a base station, the instructions to cause the base station to:
    operate as a source base station during a handover (HO) process handing over a user equipment (UE) to a target base station;
    provide downlink (DL) data to the UE following transmission of an HO command to the UE;
    initiate an HO event timer and access event estimate information to estimate the occurrence of the HO event, the event estimate information comprising an expected time duration between two time events or a time-of-day value;
    forward DL data to the target base station responsive to detecting a forward DL data event during the HO process;
    detect one of stop DL data events during the HO process by estimating an occurrence of the HO event; and
    terminate providing of the DL data to the UE responsive to the detecting of one of the stop DL data events;
    wherein the stop DL data events comprises a first stop DL data event of loss of acknowledgment for DL data from the UE and a second stop DL data event of loss of status report from the UE.

6. The non-transitory computer-readable storage medium of claim 5, the forward DL data event comprising at least one of transmission of the HO command to the UE, performance of a random access channel (RACH) procedure by the UE, receipt of a random access response (RAR) message by the UE, and the UE accessing the target base station.

7. The non-transitory computer-readable storage medium of claim 5, the instructions to cause the source base station to transmit a sequence number (SN) transfer message to the target base station responsive to detecting an SN status transfer event during the HO process.

8. The non-transitory computer-readable storage medium of claim 7, the SN status transfer event comprising at least one of the UE not receiving packet data, the UE accessing the target base station, and the target base station sending confirmation to the source base station that the UE has completed the HO process.

9. An apparatus of a source base station, comprising:
    at least one memory; and
    logic for the source base station, the logic comprised in hardware coupled to the at least one memory, the logic configured to:
        initiate a handover (HO) process via a handover command to handover a user equipment (UE) to a target base station,
        provide downlink (DL) data to the UE following transmission of the HO command,
        initiate an HO event timer and access event estimate information to estimate the occurrence of the HO event, the event estimate information comprising an expected time duration between two time events or a time-of-day value;
        provide DL data to the target base station responsive to detecting a forward DL data event during the HO process;
        detect one of a set of stop DL data event by estimating an occurrence of an HO event during the HO process; and
        terminate providing the DL data to the UE responsive to detecting one of the set of stop DL data events, wherein the set of stop DL data events comprises a first stop DL data event of transmission of a sequence number (SN) status transfer message to the target base station and a second data event of receipt of a message from the target base station that a random access channel (RACH) procedure being performed by the UE.

* * * * *